(12) United States Patent
Sumitomo

(10) Patent No.: US 9,042,655 B2
(45) Date of Patent: May 26, 2015

(54) IMAGE PROCESSING APPARATUS, IMAGE PROCESSING METHOD, AND NON-TRANSITORY COMPUTER READABLE RECORDING MEDIUM

(75) Inventor: Hironori Sumitomo, Moriguchi (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/127,377

(22) PCT Filed: Apr. 9, 2012

(86) PCT No.: PCT/JP2012/059667
§ 371 (c)(1),
(2), (4) Date: Dec. 20, 2013

(87) PCT Pub. No.: WO2013/001885
PCT Pub. Date: Jan. 3, 2013

(65) Prior Publication Data
US 2014/0125844 A1    May 8, 2014

(30) Foreign Application Priority Data

Jun. 27, 2011   (JP) ................................ 2011-142039

(51) Int. Cl.
*G06K 9/46*    (2006.01)
*G06K 9/66*    (2006.01)
(Continued)

(52) U.S. Cl.
CPC .............. *H04N 5/907* (2013.01); *G06T 7/0042* (2013.01); *G06T 2207/20016* (2013.01); *H04N 2013/0081* (2013.01); *H04N 13/0239* (2013.01)

(58) Field of Classification Search
USPC ....................... 348/42–60, 135–160, 180–194, 348/207.1–207.11, 222.1, 231.99–231.9, 348/262–265; 382/108, 141–152, 154, 382/190–205, 209–223, 276–283
See application file for complete search history.

(56) References Cited

U.S. PATENT DOCUMENTS 7,028,271 B2 *  4/2006  Matsugu et al. .............. 716/107
7,054,850 B2 *  5/2006  Matsugu ......................... 706/48
(Continued)

FOREIGN PATENT DOCUMENTS

JP    6-231254 A    8/1994
JP    2008-304202 A    12/2008
(Continued)

OTHER PUBLICATIONS

International Search Report in International Application No. PCT/JP2012/029667 mailed May 22, 2012, 2 pages.

*Primary Examiner* — Michael Osinski
(74) *Attorney, Agent, or Firm* — Brinks Gilson & Lione

(57) ABSTRACT

A converted reference image generated from a reference image is searched for a first corresponding point corresponding to a first standard point included in a converted standard image generated from a standard image. Based on a position of the first corresponding point in the converted reference image, a second search standard point is determined on the reference image. Further, based on phase information on each frequency component regarding a second standard area including a second standard point corresponding to the first standard point of the standard image, and based on phase information on each frequency component regarding a second reference area including the second search standard point of the reference image, the reference image is searched for a second corresponding point corresponding to the second standard point. The information on a frequency component obtained in the computation on another stage is reused in the search on the two stages above.

24 Claims, 18 Drawing Sheets

(51) Int. Cl.
*G06K 9/00* (2006.01)
*G06K 9/36* (2006.01)
*H04N 5/225* (2006.01)
*H04N 5/907* (2006.01)
*G06T 7/00* (2006.01)
*H04N 13/00* (2006.01)
*H04N 13/02* (2006.01)

(56) References Cited

U.S. PATENT DOCUMENTS

| | | | |
|---|---|---|---|
| 7,937,346 B2* | 5/2011 | Kato et al. | 706/27 |
| 8,036,454 B2* | 10/2011 | Sumitomo | 382/154 |
| 8,209,172 B2* | 6/2012 | Mitarai et al. | 704/240 |
| 8,675,974 B2* | 3/2014 | Iio et al. | 382/225 |
| 8,792,725 B2* | 7/2014 | Yamanaka et al. | 382/195 |
| 2002/0038294 A1* | 3/2002 | Matsugu | 706/20 |
| 2002/0181765 A1* | 12/2002 | Mori et al. | 382/158 |
| 2002/0181775 A1* | 12/2002 | Matsugu | 382/195 |
| 2003/0044073 A1* | 3/2003 | Matsugu et al. | 382/195 |
| 2004/0103095 A1* | 5/2004 | Matsugu et al. | 707/6 |
| 2005/0185835 A1* | 8/2005 | Matsugu et al. | 382/159 |
| 2008/0013836 A1* | 1/2008 | Nakamura et al. | 382/209 |
| 2009/0010530 A1* | 1/2009 | Sumitomo | 382/154 |
| 2011/0026773 A1* | 2/2011 | Sumitomo et al. | 382/106 |
| 2011/0170785 A1* | 7/2011 | Ushijima et al. | 382/195 |
| 2011/0274175 A1* | 11/2011 | Sumitomo | 375/240.16 |
| 2012/0013713 A1* | 1/2012 | Sumitomo | 348/46 |
| 2012/0044327 A1* | 2/2012 | Horita et al. | 348/47 |
| 2012/0098930 A1* | 4/2012 | Yamaguchi | 348/43 |
| 2012/0169871 A1* | 7/2012 | Sablak et al. | 348/143 |
| 2012/0294538 A1* | 11/2012 | Yamada et al. | 382/218 |
| 2013/0336540 A1* | 12/2013 | Zhang et al. | 382/108 |
| 2014/0064639 A1* | 3/2014 | Yamane et al. | 382/299 |
| 2014/0147049 A1* | 5/2014 | Sumitomo et al. | 382/190 |
| 2015/0010240 A1* | 1/2015 | Sumitomo | 382/205 |

FOREIGN PATENT DOCUMENTS

| | | |
|---|---|---|
| JP | 2009-294773 A | 12/2009 |
| WO | WO 2011/129361 A1 | 10/2011 |

* cited by examiner

F I G. 1
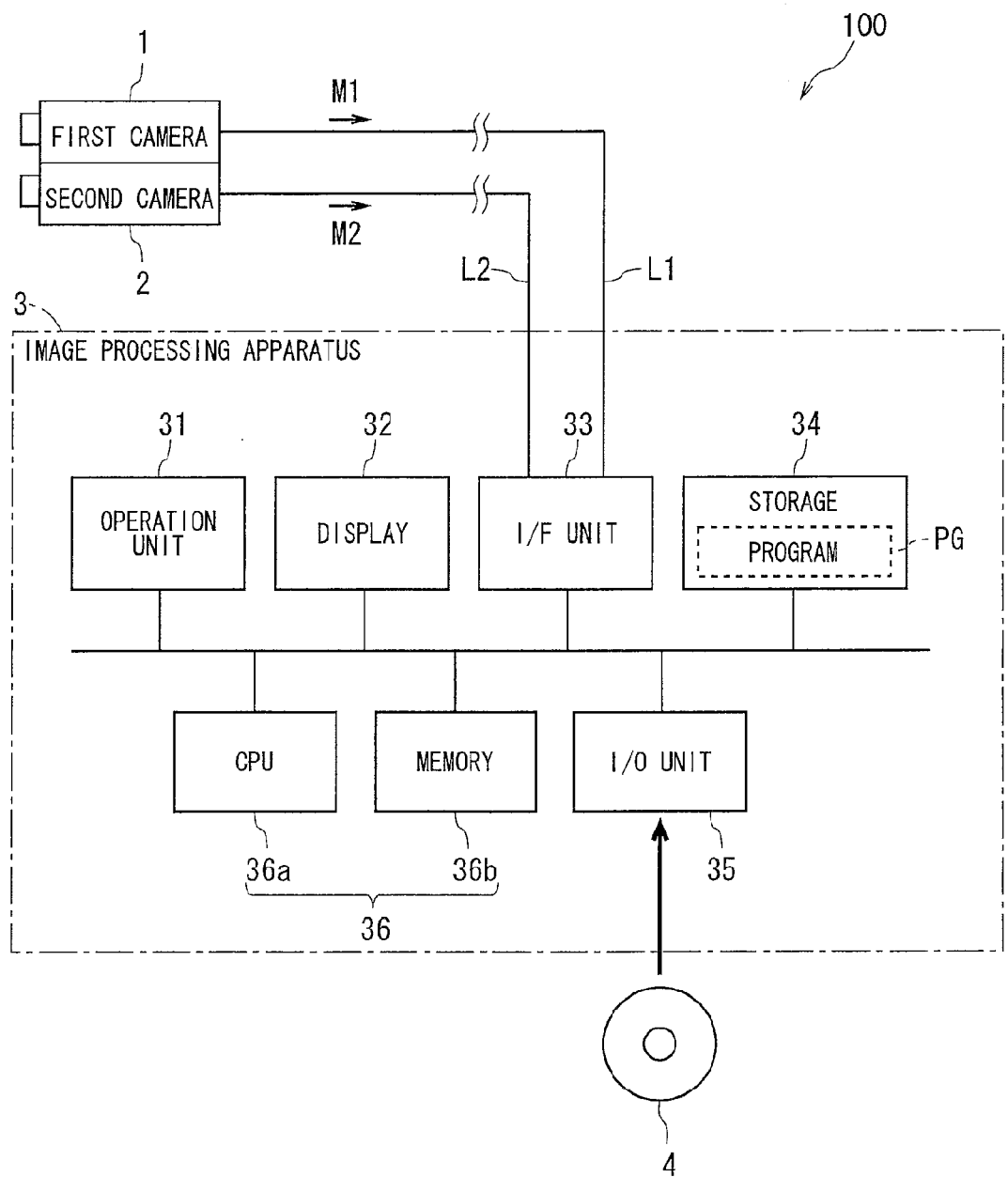

F I G. 1 6
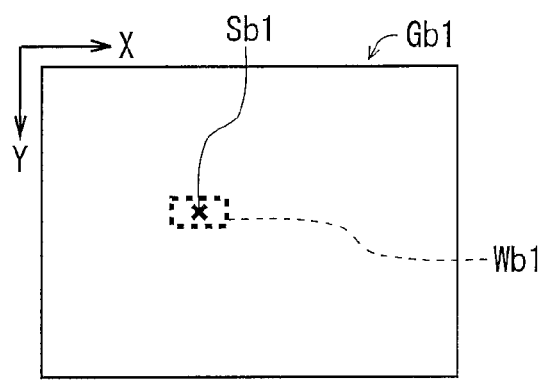
F I G. 1 7
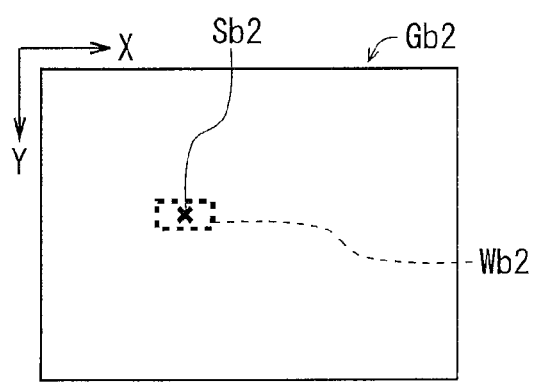

F I G. 2 2
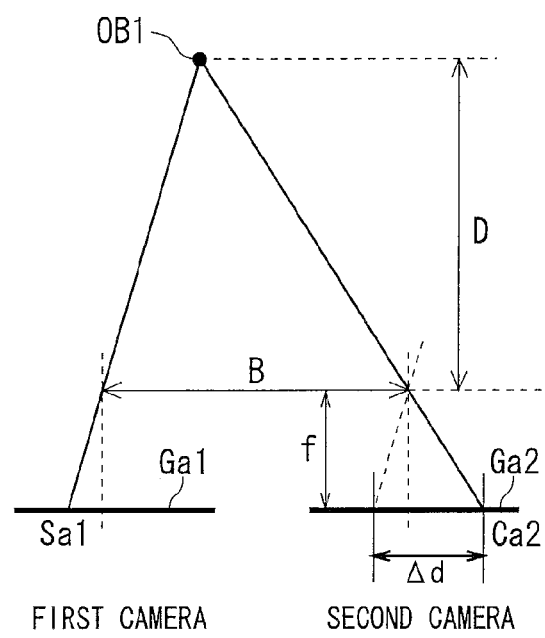

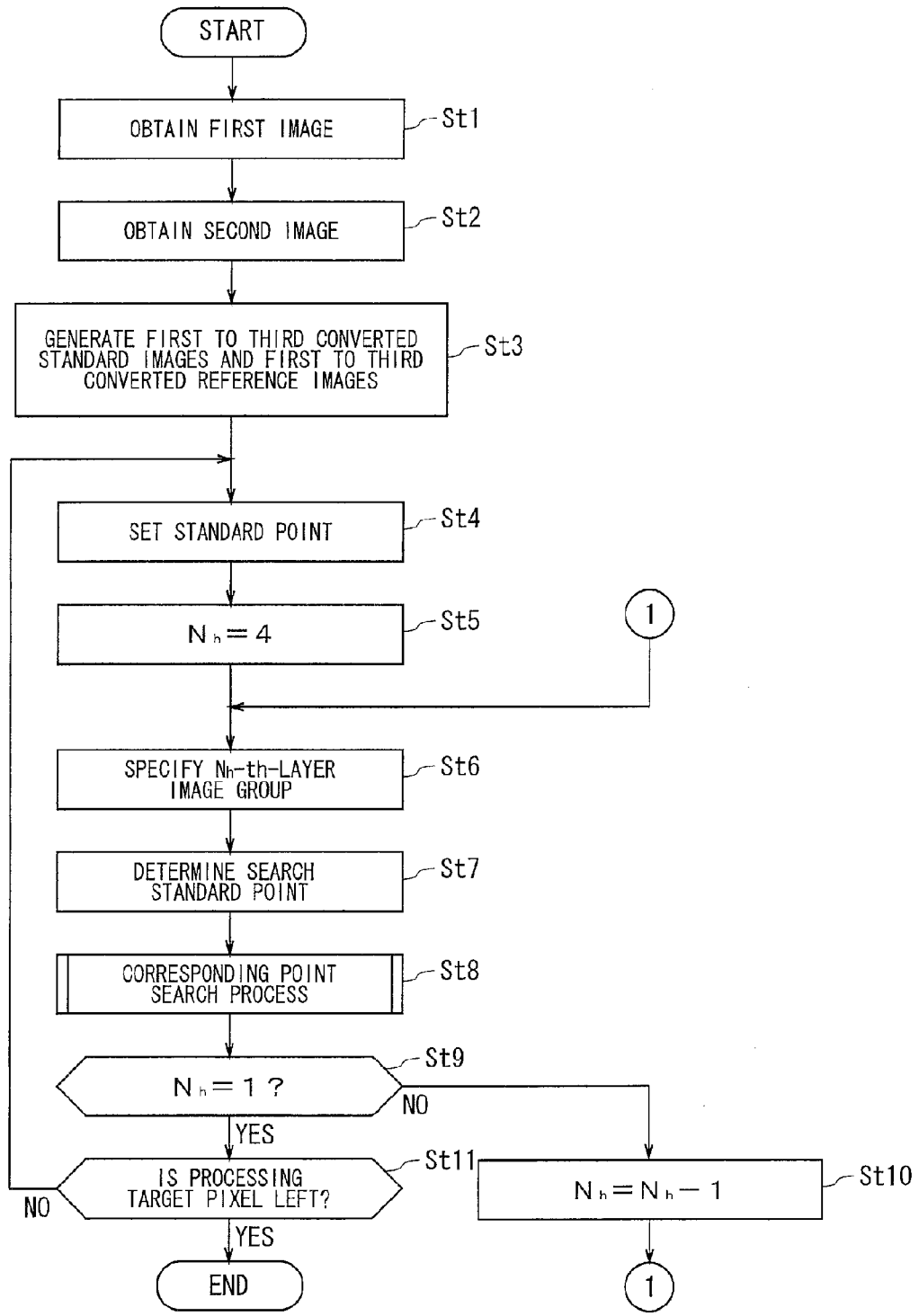

F I G. 3 1
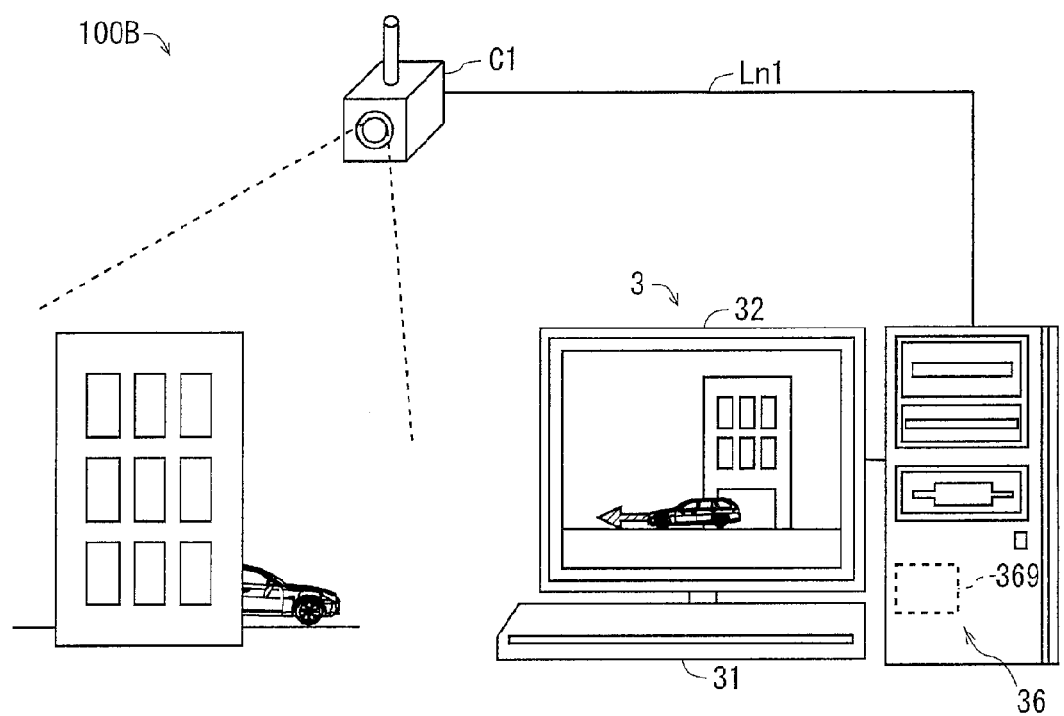

IMAGE PROCESSING APPARATUS, IMAGE PROCESSING METHOD, AND NON-TRANSITORY COMPUTER READABLE RECORDING MEDIUM

TECHNICAL FIELD

The present invention relates to an image processing technology.

BACKGROUND ART

There is known a technology of searching for corresponding points between a standard image and a reference image obtained by imaging the same object (subject) from different viewpoints by two imaging devices. In this technology, the reference image is searched for a corresponding point at which the same object as that of a reference point of the standard image is captured, based on a degree of correlation obtained by, for example, correlation computations such as sum of absolute difference (SAD) computation and phase-only correlation (POC) computation.

Another process is known in which, for example, a plurality of images having different levels of resolution are generated for each of a standard image and a reference image and are hierarchized per level of resolution, and then, corresponding points are repeatedly searched for through a correlation computation from an upper layer having a low level of resolution toward a lower layer having a high level of resolution in order. This process sets a search area in the next layer based on the parallax obtained in the upper layer having a low level of resolution, and thus can reduce a period of time required for the computation processes up to the lowermost layer having the highest level of resolution.

There is proposed a technology that, in search for a corresponding point of each pixel, determines a layer regarding a level of resolution that is subjected to the process of searching for a corresponding point next in accordance with a degree of reliability, where the degree of reliability is a value indicating a degree of correlation such as SAD value and POC value obtained through correlation computation for the upper layer having a low level of resolution (for example, Japanese Patent Application Laid-Open No. 2009-294733).

SUMMARY OF THE INVENTION

Problems to be Solved by the Invention

According to the technology of Japanese Patent Application No. 2009-294733, unfortunately, the computation amount and computation time required for searching for corresponding points depend on the conditions of the standard image and reference image. For this reason, various applications using the results of searching for corresponding points need to be designed so as to perform computations using the results of searching for corresponding points, where the case of the longest computation time required for searching for a corresponding point is taken as a standard. Also, the computation for searching for corresponding points is not uniform but varies in accordance with the conditions of the standard image and reference image. Thus, the hardware in which the flow of the processing is implemented through a pipeline process or other process is not easily configured.

The present invention has been made in view of the above-mentioned problems, and an object thereof is to provide a technology capable of improving a speed of searching for a corresponding point irrespective of an image condition.

Means to Solve the Problems

In order to solve the above-mentioned problems, an image processing apparatus according to a first aspect includes: an acquisition section that obtains a first image and a second image; a generation section that, in accordance with a predetermined conversion factor, reduces a level of resolution of the first image to generate a first converted standard image and reduces a level of resolution of the second image to generate a first converted reference image; a search section that performs: a first search process of searching the first converted reference image for a first corresponding point that corresponds to a first standard point based on first phase information on each frequency component of first frequency information regarding a first standard area including the first standard point as a standard in the first converted standard image and based on second phase information on each frequency component of second frequency information regarding a first reference area including a first search standard point as a standard in the first converted reference image; and a second search process of searching the second image for a second corresponding point that corresponds to a second standard point based on third phase information on each frequency component of third frequency information regarding a second standard area including the second standard point corresponding to the first standard point as a standard in the first image and based on fourth phase information on each frequency component of fourth frequency information regarding a second reference area including a second search standard point as a standard in the second image; a determination section that determines a position of the second search standard point in the second image based on a position of the first corresponding point in the first converted reference image; and a storage section that stores computed information regarding at least part of the first frequency information and the second frequency information obtained through the computation in the first search process and the third frequency information obtained through the computation in the second search process, wherein the search section performs at least one of: in the second search process, the process of using the computed information obtained through the computation in the first search process as part of information for computations regarding the third frequency information and the fourth frequency information to calculate the other of the information for computations regarding the third frequency information and the fourth frequency information based on the first and second images; and in the first search process, the process of using the computed information obtained through the computation in the second search process as part of information for computation regarding the first frequency information to calculate the other of the information for computation regarding the first frequency information based on the first converted standard image.

An image processing apparatus according to a second aspect includes: an acquisition section that obtains a first image and a second image; a generation section that, in accordance with a predetermined conversion factor, reduces a level of resolution of the first image to generate a first converted standard image and a second converted standard image having a lower level of resolution than that of the first converted standard image and reduces a level of resolution of the second image to generate a first converted reference image and a second converted reference image having a lower level of resolution than that of the first converted reference image; a search section that performs: a first search process of searching the second converted reference image for a first corresponding point that corresponds to a first standard point based on first phase information on each frequency component of first frequency information regarding a first standard area including the first standard point as a standard in the second converted standard image and based on second phase information on each frequency component of second frequency information regarding a first reference area including a first search standard point as a standard in the second converted reference image; and a second search process of searching the first converted reference image for a second corresponding point that corresponds to a second standard point corresponding to the first standard point based on third phase information on each frequency component of third frequency information regarding a second standard area including the second standard point as a standard in the first converted standard image and based on fourth phase information on each frequency component of fourth frequency information regarding a second reference area including a second search standard point as a standard in the first converted reference image; a determination section that determines a position of the second search standard point in the first converted reference image based on a position of the first corresponding point in the second converted reference image; and a storage section that stores computed information regarding at least part of the first frequency information and the second frequency information obtained through the computation in the first search process and the third frequency information obtained through the computation in the second search process, wherein the search section performs at least one of: in the second search process, the process of using the computed information obtained through the computation in the first search process as part of information for computations regarding the third frequency information and the fourth frequency information to calculate the other of the information for computations regarding the third frequency information and the fourth frequency information based on the first converted standard image and the first converted reference image; and in the first search process, the process of using the computed information obtained through the computation in the second search process as part of information for computation regarding the first frequency information to calculate the other of the information for computation regarding the first frequency information based on the second converted standard image.

In a third aspect, in the image processing apparatus according to the first or second aspect, the search section uses a phase-only correlation computation in the first and second search processes.

In a fourth aspect, in the image processing apparatus according to any one of the first to third aspects, the computed information includes at least part of the first frequency information to the third frequency information.

In a fifth aspect, in the image processing apparatus according to any one of the first to fourth aspects, the computed information includes at least part of the first phase information to the third phase information.

In a sixth aspect, in the image processing apparatus according to any one of the first to fifth aspects, the computed information includes information indicative of a phase difference calculated based on the first phase information and the second phase information.

In a seventh aspect, in the image processing apparatus according to the first or second aspect: in the first search process, for each frequency component, the search section calculates a first phase difference based on the first phase information and the second phase information to convert the first phase difference into a first spatial deviation amount, and votes the first spatial deviation amount to a first voting space to obtain a first voting result, to thereby search for the first corresponding point in accordance with the first voting result; in the second search process, for each frequency component, the search section calculates a second phase difference based on the third phase information and the fourth phase information to convert the second phase difference into a second spatial deviation amount, and votes the second spatial deviation amount to a second voting space to obtain a second voting result, to thereby search for the second corresponding point in accordance with the second voting result; and the computed information includes information indicative of a voting result obtained by converting the first phase difference of one or more frequency components into a spatial deviation amount and then voting the spatial deviation amount to the first voting space in the first search process.

In an eighth aspect, in the image processing apparatus according to any one of the first to fifth aspects: in the second search process, the search section corrects the first phase information by a deviation amount of a phase corresponding to a reduction in the level of resolution and uses the corrected first phase information in computation upon obtaining the first phase information from the computed information calculated in the first search process and using the first phase information in computation, and corrects the second phase information by a deviation amount of a phase corresponding to a reduction in the level of resolution and uses the corrected second phase information in computation upon obtaining the second phase information from the computed information calculated in the first search process and using the second phase information in computation; and in the first search process, the search section corrects the third phase information by a deviation amount of a phase corresponding to a reduction in the level of resolution and uses the corrected third phase information in computation upon obtaining the third phase information from the computed information calculated in the second search process and using the third phase information in computation.

In a ninth aspect, in the image processing apparatus according to any one of the first to eighth aspects: the predetermined conversion factor is 1/n where n is any number larger than one; in the second search process, the search section uses the first frequency information regarding a first frequency as the third frequency information regarding a second frequency obtained by multiplying the first frequency by 1/n upon obtaining the first frequency information regarding the first frequency from the computed information calculated in the first search process and using the first frequency information in computation, and uses the second frequency information regarding the first frequency as the fourth frequency information regarding the second frequency upon obtaining the second frequency information regarding the first frequency from the computed information calculated in the first search process and using the second frequency information in computation; and in the first search process, the search section uses the third frequency information regarding the second frequency as the first frequency information regarding the first frequency obtained by multiplying the second frequency by n upon obtaining the third frequency information regarding the second frequency from the computed information calculated in the second search process and using the third frequency information in computation.

In a tenth aspect, in the image processing apparatus according to any one of the first to ninth aspects, in the second search process, the search section corrects a deviation of a phase of the second phase information in accordance with a spatial deviation amount between the first search standard point and the first corresponding point and uses the corrected second phase information in computation upon obtaining the second phase information from the computed information calculated in the first search process and using the second phase information in computation.

In an eleventh aspect, in the image processing apparatus according to any one of the first to tenth aspects, in the second search process, the search section performs weighting of information such that the computed information used in computation as part of information for computations regarding the third frequency information and the fourth frequency information less affects the search results on the second corresponding point than the other of the information for computations.

An image processing method according to a twelfth aspect includes the steps of: (a) by an acquisition section, obtaining a first image; (b) by the acquisition section, obtaining a second image; (c) by a generation section, in accordance with a predetermined conversion factor, reducing a level of resolution of the first image to generate a first converted standard image and reducing a level of resolution of the second image to generate a first converted reference image; (d) by a search section, performing a first search process of searching the first converted reference image for a first corresponding point that corresponds to a first standard point based on first phase information on each frequency component of first frequency information regarding a first standard area including the first standard point as a standard in the first converted standard image and based on second phase information on each frequency component of second frequency information regarding a first reference area including a first search standard point as a standard in the first converted reference image, and by a storage section, storing computed information regarding at least part of the first frequency information and the second frequency information obtained through the computation in the first search process; (e) by a determination section, determining a position of a second search standard point in the second image based on a position of the first corresponding point in the first converted reference image; and (f) by the search section, performing a second search process of searching the second image for a second corresponding point that corresponds to a second standard point corresponding to the first standard point based on third phase information on each frequency component of third frequency information regarding a second standard area including the second standard point as a standard in the first image and based on fourth phase information on each frequency component of fourth frequency information regarding a second reference area including the second search standard point as a standard in the second image, wherein in the step (f), the search section uses the computed information as part of information for computations regarding the third frequency information and the fourth frequency information to calculate the other of the information for computations based on the first and second images.

An image processing method according to a thirteenth aspect includes the steps of: (A) by an acquisition section, obtaining a first image; (B) by the acquisition section, obtaining a second image; (C) by a generation section, in accordance with a predetermined conversion factor, reducing a level of resolution of the first image to generate a first converted standard image and a second converted standard image having a lower level of resolution than that of the first converted standard image, and reducing a level of resolution of the second image to generate a first converted reference image and a second converted reference image having a lower level of resolution than that of the first converted reference image; (D) by a search section, performing a first search process of searching the second converted reference image for a first corresponding point that corresponds to a first standard point based on first phase information on each frequency component of first frequency information regarding a first standard area including the first standard point as a standard in the second converted standard image and based on second phase information on each frequency component of second frequency information regarding a first reference area including a first search standard point as a standard in the second converted reference image, and by a storage section, storing computed information regarding at least part of the first frequency information and the second frequency information obtained through the computation in the first search process; (E) by a determination section, determining a position of a second search standard point in the first converted reference image based on a position of the first corresponding point in the second converted reference image; and (F) by the search section, performing a second search process of searching the first converted reference image for a second corresponding point that corresponds to a second standard point corresponding to the first standard point based on third phase information on each frequency component of third frequency information regarding a second standard area including the second standard point as a standard in the first converted standard image and based on fourth phase information on each frequency component of fourth frequency information regarding a second reference area including the second search standard point as a standard in the first converted reference image, wherein in the step (F), the search section uses the computed information as part of information for computations regarding the third frequency information and the fourth frequency information to calculate the other of the information for computations based on the first converted standard image and the first converted reference image.

A non-transitory computer readable recording medium according to a fourteenth aspect stores a computer-readable program controlling an mage processing apparatus to operate as one image processing apparatus. The one image processing apparatus includes: an acquisition section that obtains a first image and a second image; a generation section that, in accordance with a predetermined conversion factor, reduces a level of resolution of the first image to generate a first converted standard image and reduces a level of resolution of the second image to generate a first converted reference image; a search section that performs: first search process of searching the first converted reference image for a first corresponding point that corresponds to a first standard point based on first phase information on each frequency component of the first frequency information regarding a first standard area including the first standard point as a standard in the first converted standard image and based on second phase information on each frequency component of second frequency information regarding a first reference area including a first search standard point as a standard in the first converted reference image; and a second search process of searching the second image for a second corresponding point that corresponds to a second standard point based on third phase information on each frequency component of third frequency information regarding a second standard area including the second standard point corresponding to the first standard point as a standard in the first image and based on fourth phase information on each frequency component of fourth frequency information regarding a second reference area including a second search standard point as a standard in the second image; a determination section that determines a position of the second search standard point in the second image based on a position of the first corresponding point in the first converted reference image; and a storage section that stores computed information regarding at least part of the first frequency information and the second frequency information obtained through the computation in the first search process and the third frequency information obtained through the computation in the second search process. The search section performs at least one of: in the second search process, the process of using the computed information obtained through the computation in the first search process as part of information for computations regarding the third frequency information and the fourth frequency information to calculate the other of the information for computations regarding the third frequency information and the fourth frequency information based on the first and second images; and in the first search process, the process of using the computed information obtained through the computation in the second search process as part of information for computation regarding the first frequency information to calculate the other of the information for computation regarding the first frequency information based on the first converted standard image.

A non-transitory computer readable recording medium according to a fifteenth aspect stores a computer-readable program controlling an image processing apparatus to operate as one image processing apparatus. The one image processing apparatus includes: an acquisition section that obtains a first image and a second image; a generation section that, in accordance with a predetermined conversion factor, reduces a level of resolution of the first image to generate a first converted standard image and a second converted standard image having a lower level of resolution than that of the first converted standard image and reduces a level of resolution of the second image to generate a first converted reference image and a second converted reference image having a lower level of resolution than that of the first converted reference image; a search section that performs: a first search process of searching the second converted reference image for a first corresponding point that corresponds to a first standard point based on first phase information on each frequency component of first frequency information regarding a first standard area including the first standard point as a standard in the second converted standard image and based on second phase information on each frequency component of second frequency information regarding a first reference area including a first search standard point as a standard in the second converted reference image; and a second search process of searching the first converted reference image for a second corresponding point that corresponds to a second standard point corresponding to the first standard point based on third phase information on each frequency component of third frequency information regarding a second standard area including the second standard point as a standard in the first converted standard image and based on fourth phase information on each frequency component of fourth frequency information regarding a second reference area including a second search standard point as a standard in the first converted reference image; a determination section that determines a position of the second search standard point in the first converted reference image based on a position of the first corresponding point in the second converted reference image; and a storage section that stores computed information regarding at least part of the first frequency information and the second frequency information obtained through the computation in the first search process and the third frequency information obtained through the computation in the second search process. The search section performs at least one of: in the second search process, the process of using the computed information obtained through the computation in the first search process as part of information for computations regarding the third frequency information and the fourth frequency information to calculate the other of the information for computations regarding the third frequency information and the fourth frequency information based on the first converted standard image and the first converted reference image; and in the first search process, the process of using the computed information obtained through the computation in the second search process as part of information for computation regarding the first frequency information to calculate the other of the information for computation regarding the first frequency information based on the second converted standard image.

Effects of the Invention

The image processing apparatus according to any one of the first to eleventh aspects can reduce a computation amount by reusing the information regarding a frequency component, which is obtained through the computation of the corresponding point search process between two images, in the computation of a corresponding point search process between two images having different levels of resolution. This can result in an increase in speed of searching for a corresponding point irrespective of the condition of an image to be used in the corresponding point search. Also, the computations are made uniform, so that a part that performs a corresponding point search process can be implemented as hardware such as a dedicated electronic circuit.

The image processing apparatus according to the third aspect can increase the search speed in the highly accurate corresponding point search.

The image processing apparatus according to any one of the fifth to seventh aspects can further increase the speed of searching for a corresponding point through an additional reduction in computation amount. Also, the storage capacity of the storage can be reduced through a reduction in amount of the information to be reused. This can result in reductions in the size and manufacturing cost of the image processing apparatus.

The image processing apparatus according to the eighth aspect corrects the information to be reused by a deviation amount of a phase corresponding to a reduction in level of resolution. This can improve the accuracy of searching for a corresponding point.

In the image processing apparatus according to the ninth aspect, the correlation relationship between the frequencies of the information to be reused is determined in accordance with a conversion factor regarding a reduction in level of resolution. This can make it easy to design the computation in the corresponding point search process.

The image processing apparatus according to the tenth aspect corrects the information to be reused in accordance with a spatial deviation amount between the search standard point and corresponding point in the corresponding point search process for two images having a relatively low level of resolution. This can improve the accuracy of searing for a corresponding point.

The image processing apparatus according to the eleventh aspect performs weighting of information such that in the corresponding point search process for two images having a relatively high level of resolution, the information to be reused less affects the search results of a corresponding point than the other information. This can improve the accuracy of searching for a corresponding point.

The image processing method according to the twelfth or thirteenth aspect can achieve similar effects to those of the image processing apparatus according to the first or second aspect.

The non-transitory computer readable recording medium according to the fourteenth or fifteenth aspect can achieve similar effects to those of the image processing apparatus according to the first to eleventh aspects.

BRIEF DESCRIPTION OF DRAWINGS

FIG. 1 is a diagram showing an exemplary configuration of an information processing system according to an embodiment.

FIG. 16 is a diagram illustrating a manner of setting a standard area of the second layer.

FIG. 17 is a diagram illustrating a manner of setting a reference area of the second layer.

FIG. 22 is a diagram for describing a distance measuring method using the principle of triangulation.

FIG. 23 is a flowchart illustrating an operational flow of a corresponding point search operation.

FIG. 31 is a diagram showing another exemplary application of the information processing system.

DESCRIPTION OF EMBODIMENTS

Figure 2:
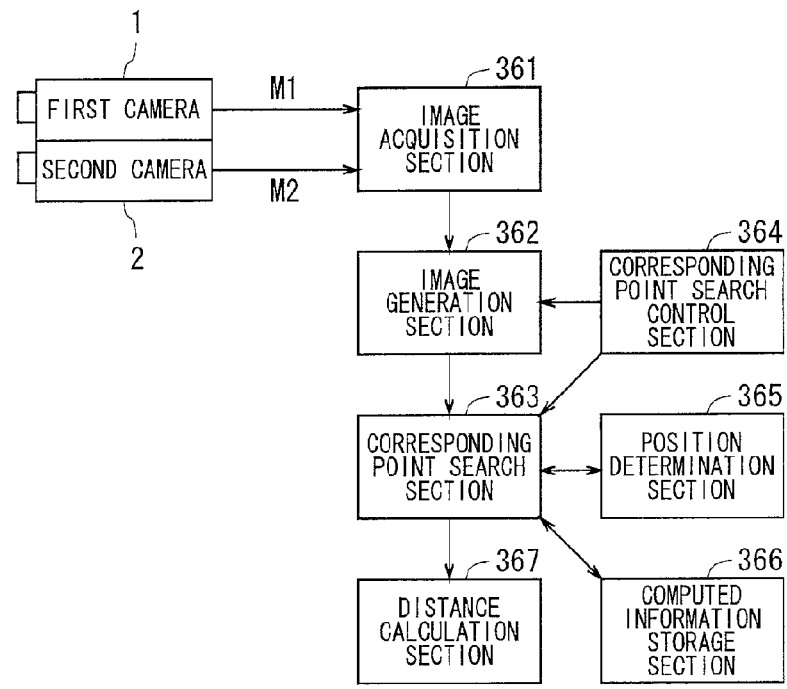
FIG. 2 is a block diagram showing a functional configuration of the information processing system of the embodiment.

Hereinbelow, one embodiment of the present invention is described with reference to the drawings. The same references denote the parts having similar configurations and functions in the drawings, and a redundant description is not given below. The drawings are schematically shown, which do not accurately illustrate, for example, the size and positional relationship of various structures.

(1) Schematic Configuration of Information Processing System

FIG. 1 is a diagram showing a schematic configuration of an information processing system 100 according to an embodiment. The information processing system 100 includes a first camera 1, a second camera 2, and an image processing apparatus 3. The first camera 1 is connected to the image processing apparatus 3 via a communication line L1 so as to perform data transmission, and the second camera 2 is connected to the image processing apparatus 3 via a communication line L2 so as to perform data transmission. The communication lines L1 and L2 may be wired lines or wireless lines.

The first and second cameras 1 and 2 are respective imaging devices that image a subject to obtain an image. The first and second cameras 1 and 2 are arranged side by side in one direction. The one direction may be, for example, horizontal. In a case where the one direction is horizontal, an optical axis of an imaging lens of the first camera 1 and an optical axis of an imaging lens of the second camera 2 are horizontally separated from each other. The separation distance between the optical axis of the imaging lens of the first camera 1 and the optical axis of the imaging lens of the second camera 2 is the baseline length of the first and second cameras 1 and 2.

The first and second cameras 1 and 2 image the subject located in front of the cameras by, for example, imaging device at the same timing from different viewpoints, to thereby obtain a so-called stereo image. In other words, the stereo image includes an image (also referred to as a first image) obtained through imaging by the first camera 1 and an image (also referred to as a second image) obtained through imaging by the second camera 2. Data M1 of the first image and data M2 of the second image can be transmitted from the first and second cameras 1 and 2 to the image processing apparatus 3 via the communication lines L1 and L2.

The image processing apparatus 3, which may be a personal computer (PC), includes an operation unit 31, a display 32, an interface (I/F) unit 33, a storage 34, an input/output (I/O) unit 35, and a controller 36.

The operation unit 31 includes, for example, a mouse and a keyboard. The display 32 includes, for example, a liquid crystal display. The I/F unit 33 exchanges, for example, data between the first and second cameras 1 and 2 and the image processing apparatus 3. The storage 34 includes, for example, a hard disk and stores a program PG and various data. The I/O unit 35 includes, for example, a disk drive and accepts a storage medium 4 such as an optical disk to exchange data between the storage medium 4 and the controller 36. The controller 36 includes, for example, a CPU 36a serving as a processor, a memory 36b for temporarily storing information, and the like. The controller 36 reads and executes the program PG stored in the storage 34, thereby implementing various functions, various information processes, and the like. The various information temporarily obtained through the various information processes are stored in, for example, the memory 36b.

In this embodiment, for the sake of simplification of description, the aberration of the first and second cameras 1 and 2 is favorably corrected, and the first and second cameras 1 and 2 are set approximately parallel. In other words, the optical axes of the first and second cameras 1 and 2 are set approximately parallel, and the subject captured in the first and second images has approximately the same angular relationship with respect to the outer edges of the first and second images. If the first and second cameras 1 and 2 are not actually under the above-mentioned conditions, it suffices that a stereo image, which is regarded as one imaged under similar conditions through an image processing, is obtained.

(2) Functional Configuration of Information Processing System

FIG. 2 is a block diagram showing a functional configuration of main parts of the information processing system 100 according to this embodiment. FIG. 2 shows a functional configuration regarding the corresponding point search operation and the distance measuring operation using the search results of the corresponding point search operation. Here, the corresponding point search process is the processing of searching for the correspondence relationship of pixels capturing the same part of a subject between the first image and second image obtained by the first and second cameras 1 and 2. The distance measuring operation is the operation of measuring the distance from the first and second cameras 1 and 2 to the subject. In the corresponding point search operation, the first image and second image are used as an image (also referred to as a standard image) Ga1 serving as a standard and an image (also referred to as a reference image) Ga2 for reference, respectively.

The controller 36 includes, as a functional configuration, an image acquisition section 361, an image generation section 362, a corresponding point search section 363, a corresponding point search control section 364, a position determination section 365, a computed information storage section 366, and a distance calculation section 367.

The image acquisition section 361 obtains the data M1 of the first image from the first camera 1 and the data M2 of the second image from the second camera 2. The first image and second image preferably have the same level of resolution. Here, the level of resolution means how finely an object drawn in images is depicted. Besides, the same level of resolution means the same number of pixels horizontally and the same number of pixels vertically in the images.

The image generation section 362 sequentially reduces the level of resolution of the first image serving as the standard image Ga1 in accordance with a predetermined conversion factor to generate a first converted standard image Gb1, a second converted standard image Gc1, and a third converted standard image Gd1. The image generation section 362 also sequentially reduces the level of resolution of the second image serving as the reference image Ga2 in accordance with a predetermined conversion factor to generate a first converted reference image Gb2, a second converted reference image Gc2, and a third converted reference image Gd2. Here, the first converted standard image Gb1 has a lower level of resolution than that of the standard image Ga1, the second converted standard image Gc1 has a lower level of resolution than that of the first converted standard image Gb1, and the third converted standard image Gd1 has a lower level of resolution than that of the second converted standard image Gc1. Meanwhile, the first converted reference image Gb2 has a lower level of resolution than that of the reference image Ga2, the second converted reference image Gc2 has a lower level of resolution than that of the first converted reference image Gb2, and the third converted reference image Gd2 has a lower level of resolution than that of the second converted reference image Gc2.

Figure 3:
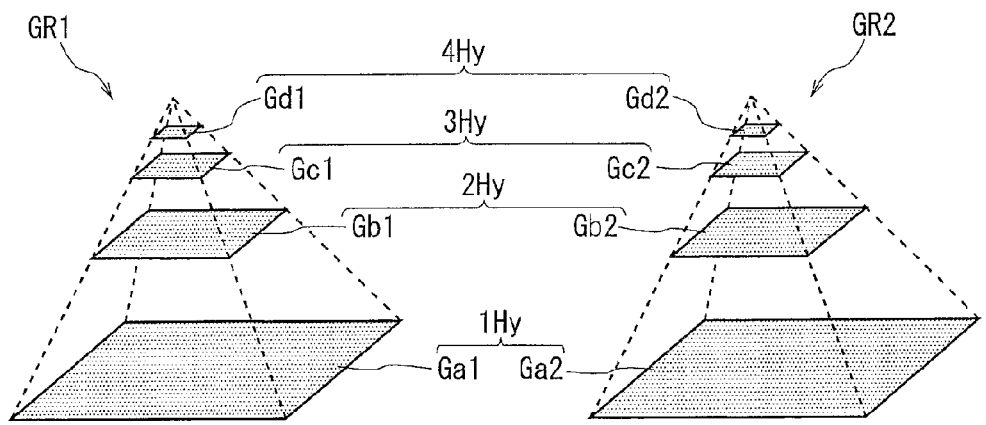
FIG. 3 is a diagram showing an image group having multiple stages of levels of resolution of first and second images.

As shown in FIG. 3, consequently, an image group GR1 having an M-stage (M is an integer equal to or more than two) level of resolution, which includes the standard image Ga1 and the first to third converted standard images Gb1 to Gd1, is generated for the standard image Ga1. Similarly, an image group GR2 having an M-stage (M is an integer equal to or more than two) level of resolution, which includes the reference image Ga2 and the first to third converted reference images Gb2 to Gd2, is generated for the reference image Ga2. This embodiment is described assuming that M is four.

From another perspective, a second-layer image group 2Hy, a third-layer image group 3Hy, and a fourth-layer image group 4Hy are generated from a first-layer image group 1Hy including the standard image Ga1 and reference image Ga2. The second-layer image group 2Hy includes the first converted standard image Gb1 and first converted reference image Gb2, the third-layer image group 3Hy includes the second converted standard image Gc1 and second converted reference image Gc2, and the fourth-layer image group 4Hy includes the third converted standard image Gd1 and third converted reference image Gd2.

The corresponding point search section 363 searches for corresponding points among a plurality of images by the correlation computation such as phase-only correlation (POC) computation.

Specifically, the corresponding point search section 363 performs the process (also referred to as a fourth-layer search process) of searching for corresponding points between the third converted standard image Gd1 and third converted reference image Gd2 that are included in the fourth-layer image group 4Hy. The corresponding point search section 363 performs the process (also referred to as a third-layer search process) of searching for corresponding points between the second converted standard image Gc1 and second converted reference image Gc2 included in the third-layer image group 3Hy. The corresponding point search section 363 performs the process (also referred to as a second-layer search process) of searching for corresponding points between the first converted standard image Gb1 and first converted reference image Gb2 included in the second-layer image group 2Hy. The corresponding point search section 363 performs the process (also referred to as a first-layer search process) of searching for corresponding points between the standard image Ga1 and reference image Ga2 included in the first-layer image group 1Hy.

The corresponding point search control section 364 controls the operations of the image generation section 362 and corresponding point search section 363. This allows the corresponding point search section 363 to execute the fourth-layer search process, third-layer search process, second-layer search process, and first-layer search process in this order.

Then, the information (also referred to as fourth-layer computed information) obtained through the computation in the fourth-layer search process and the search results in the fourth-layer search process are used in the third-layer search process. The information (also referred to as third-layer computed information) obtained through the computation in the third-layer search process and the search results in the third-layer search process are used in the second-layer search process. The information (also referred to as second-layer computed information) obtained through the computation in the second-layer search process and the search results in the second-layer search process are used in the first-stage search process.

Figure 4:
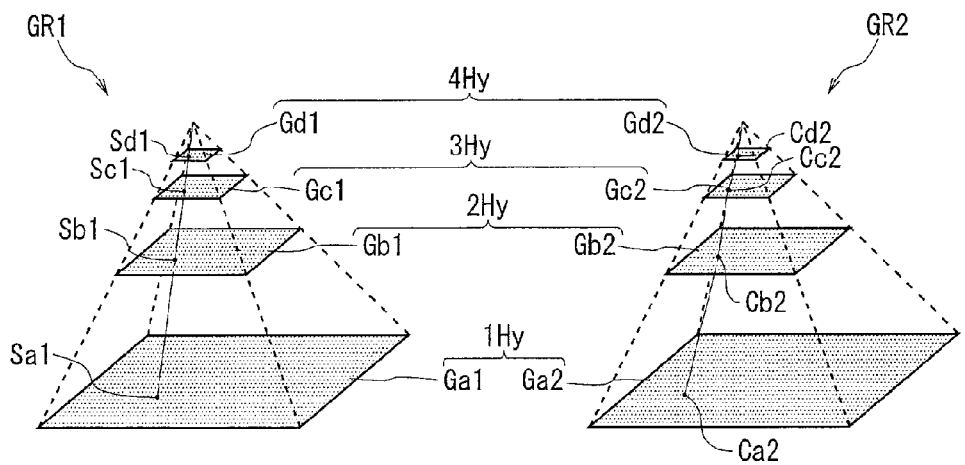
FIG. 4 is a diagram illustrating an outline of a corresponding point search operation.

For example, in the corresponding point search process, in which a pixel (also referred to as a first-layer corresponding point) Ca2 in the reference image Ga2 corresponding to a pixel (also referred to as a first-layer standard point) Sa1 serving as a standard in the process of searching the standard image Ga1 is searched, the four-layer search process as shown in FIG. 4 is performed.

Specifically, first, the corresponding point search section 363 sets the first-layer standard point Sa1 in the standard image Ga1. The corresponding point search section 363 sets a pixel (also referred to as a second-layer standard point) Sb1 capturing the same part of the subject as that of the first-layer standard point Sa1 in the first converted standard image Gb1. The corresponding point search section 363 sets a pixel (also referred to as a third-layer standard point) Sc1 capturing the same part of the subject as those of the first- and second-layer standard points Sa1 and Sb1 in the second converted standard image Gc1. The corresponding point search section 363 sets a pixel (also referred to as a fourth-layer standard point) Sd1 capturing the same part of the subject as those of the first- to third-layer standard points Sa1 to Sc1 in the third converted standard image Gd1.

In other words, in the first converted standard image Gb1, the second-layer standard point Sb1 is set at the position corresponding to the position of the first-layer standard point Sa1 in the standard image Ga1. In the second converted standard image Gc1, the third-layer standard point Sc1 is set at the position corresponding to the position of the second-layer standard point Sb1 in the first converted standard image Gb1. In the third converted standard image Gd1, the fourth-layer standard point Sd1 is set at the position corresponding to the position of the third-layer standard point Sc1 in the second converted standard image Gc1.

In the fourth-layer search process, the third converted reference image Gd2 is searched for a pixel (also referred to as a fourth-layer corresponding point) Cd2 corresponding to the fourth-layer standard point Sd1. In this search, the area including a pixel (also referred to as a fourth-layer search standard point) serving as a standard in the search in the third converted reference image Gd2 is searched for the fourth-layer corresponding point Cd2. Then, the second converted reference image Gc2 is searched for a pixel (also referred to as a third-layer corresponding point) Cc2 corresponding to the third-layer standard point Sc1 in the third-layer search process. In this search, the area including a pixel (also referred to as a third-layer search standard point) serving as a standard in the search in the second converted reference image Gc2 is searched for the third-layer corresponding point Cc2.

In the second-layer search process, the first converted reference image Gb2 is searched for a pixel (also referred to as a second-layer corresponding point) Cb2 corresponding to the second-layer standard point Sb1. In this search, the area including a pixel (also referred to as a second-layer search standard point) serving as a standard in the search in the first converted reference image Gb2 is searched for the second-layer corresponding point Cb2. Then, in the first-layer search process, the reference image Ga2 is searched for a pixel (also referred to as a first-layer corresponding point) Ca2 corresponding to the first-layer standard point Sa1. In this search, the area including a pixel (also referred to as a first-layer search standard point) serving as a standard in the search in the reference image Ga2 is searched for the first-layer corresponding point Ca2.

The position determination section 365 determines the positions of the fourth-layer search standard point, third-layer search standard point, second-layer search standard point, and first-layer search standard point. In the standard image Ga1, first to third converted standard images Gb1 to Gd1, reference image Ga2, and first to third converted reference images Gb2 to Gd2, the upper left pixel is taken as an origin, and the right direction and down direction are taken as an X direction and a Y direction, respectively. In other words, the pixels in the images Ga1 to Gd1 and Ga2 to Gd2 may be represented by XY coordinates.

Here, the fourth-layer search standard point has a predetermined positional relationship with the fourth-layer standard point Sd1 in the third converted standard image Gd1. It suffices that the predetermined positional relationship is such a relationship that, for example, the position of the fourth-layer standard point Sd1 in the third converted standard image Gd1 is identical to the position of the fourth-layer search standard point in the third converted reference image Gd2. In other words, the predetermined positional relationship may be such a relationship that the coordinates of the fourth-layer standard point Sd1 in the third converted standard image Gd1 are identical to the coordinates of the fourth-layer search standard point in the third converted reference image Gd2. Alternatively, the predetermined positional relationship may be such a relationship that, for example, positions are deviated by a predetermined number of pixels in one direction on images corresponding to the extending direction of the baseline length from the second camera 2 to the first camera 1. This one direction may be, for example, −X direction.

The position of the third-layer search standard point in the second converted reference image Gc2 is determined based on the position of the fourth-layer corresponding point Cd2 in the third converted reference image Gd2. The position of the second-layer search standard point in the first converted reference image Gb2 is determined based on the position of the third-layer corresponding point Cc2 in the second converted reference image Gc2. The position of the first-layer search standard point in the reference image Ga2 is determined based on the position of the second-layer corresponding point Cb2 in the first converted reference image Gb2.

Figure 5:
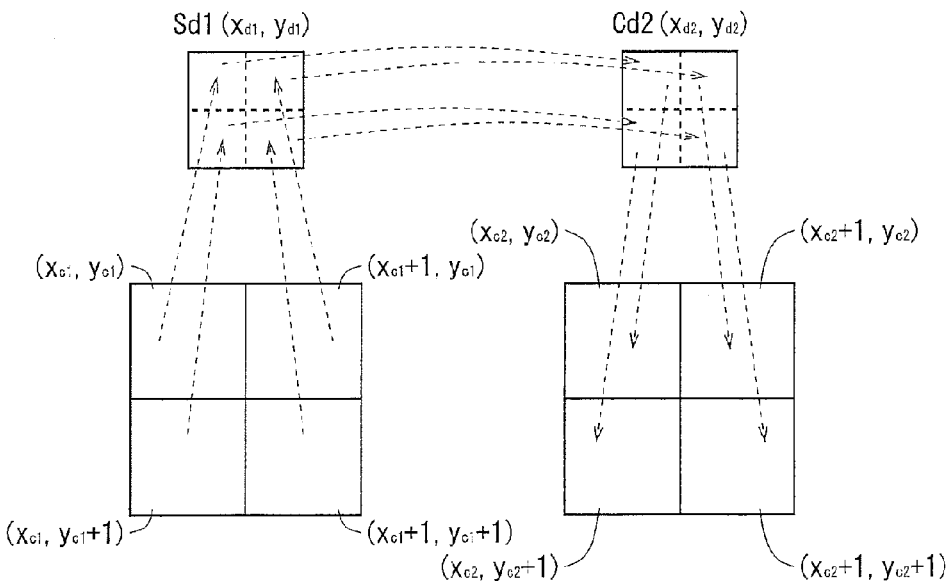
FIG. 5 is a diagram for describing a method of determining a search standard point.

FIG. 5 is a diagram for describing the method of determining the third-layer search standard point, second-layer search standard point, and first-layer search standard point. The methods of determining the third-layer search standard point, second-layer search standard point, and first-layer search standard point are similar to each other. For this reason, FIG. 5 schematically shows the method of determining the third-layer search standard point as an example. Here, description is given of an example in which the predetermined conversion factor in the image generation section 362 is ½.

For example, a pixel value of a pixel at coordinates $(x_{d1}, y_{d1})$ in the third converted standard image Gd1 on the fourth layer is an average value of pixel values of four pixels at coordinates $(x_{c1}, y_{c1})$, $(x_{c1}+1, y_{c1})$, $(x_{c1}, y_{c1}+1)$, and $(x_{c1}+1, y_{c1}+1)$ in the second converted standard image Gc1 on the third layer. In the fourth-layer search process, in a case where the pixel at the coordinates $(x_{d1}, y_{d1})$ is set at the fourth-layer standard point Sd1 and the coordinates of the fourth-layer corresponding point Cd2 corresponding to the fourth-layer standard point Sd1 are $(x_{d2}, y_{d2})$, coordinates $(x_{c2}, y_{c2})$ of the third-layer search reference point are expressed by, for example, Expression (1) below.

$$(x_{c2}, y_{c2}) = (x_{d2} \times 2, y_{d2} \times 2) \quad (1)$$

In a case where the third-layer search standard point is formed of four pixels at coordinates $(x_{c2}, y_{c2})$, $(x_{c2}+1, y_{c2})$, $(x_{c2}, y_{c2}+1)$, and $(x_{c2}+1, y_{c2}+1)$, the coordinates of the four pixels are expressed by, for example, Expressions (2), (3), (4), and (5) below.

$$(x_{c2}, y_{c2}) = (x_{d2} \times 2, y_{d2} \times 2) \quad (2)$$

$$(x_{c2}+1, y_{c2}) = (x_{d2} \times 2+1, y_{d2}) \quad (3)$$

$$(x_{c2}, y_{c2}+1) = (x_{d2} \times 2, y_{d2} \times 2+1) \quad (4)$$

$$(x_{c2}+1, y_{c2}+1) = (x_{d2} \times 2+1, y_{d2} \times 2+1) \quad (5)$$

The computed information storage section 366 stores the fourth-layer computed information obtained through the computation in the fourth-layer search process, the third-layer computed information obtained through the computation in the third-layer search process, and the second-layer computed information obtained through the computation in the second-layer search process. The computed information storage section 366 may be mainly implemented as the memory 36b or may be implemented as the storage 34.

The distance calculation section 367 calculates the distance from the first and second cameras 1 and 2 to the part of the subject, which is captured at the standard point Sa1, based on the search results by the corresponding point search section 363. Specifically, using the triangulation technique, this distance is calculated based on a deviation amount between the position of the standard point Sa1 in the standard image Ga1 and the position of the corresponding point Ca2 in the reference image Ga2 and based on the internal parameters and external parameters of the first and second cameras 1 and 2. Here, the internal parameters include parameters indicating the focal length of the optical system incorporated in the first and second cameras 1 and 2, the center of an image, an inclination of an imaging device, and the like. The external parameters include parameters indicating, for example, the positional relationship and posture relationship of the first camera 1 and the second camera 2, and the like.

(3) Generation of First- to Fourth-Layer Image Groups by Image Generation Section The image generation section 362 can generate the first converted standard image Gb1 by, for example, reducing the level of resolution of the standard image Ga1 by a first predetermined conversion factor. The image generation section 362 can generate the second converted standard image Gc1 by reducing the level of resolution of the first converted standard image Gb1 by a second predetermined conversion factor. The image generation section 362 can generate the third converted standard image Gd1 by reducing the level of resolution of the second converted standard image Gc1 by a third predetermined conversion factor. Alternatively, the image generation section 362 may generate may generate the second converted standard image Gc1 by reducing the level of resolution of the standard image Ga1 by the second predetermined conversion factor and generate the third converted standard image Gd1 by reducing the level of resolution of the standard image Ga1 by the third predetermined conversion factor.

The image generation section 362 can generate the first converted reference image Gb2 by, for example, reducing the level of resolution of the reference image Ga2 by a fourth predetermined conversion factor. The image generation section 362 can generate the second converted reference image Gc2 by reducing the level of resolution of the first converted reference image Gb2 by a fifth predetermined conversion factor. The image generation section 362 can generate the third converted reference image Gd2 by reducing the level of resolution of the second converted reference image Gc2 by a sixth predetermined conversion factor. Alternatively, the image generation section 362 may generate the second converted reference image Gc2 by reducing the level of resolution of the reference image Ga2 by the fifth predetermined conversion factor and generate the third converted reference image Gd2 by reducing the level of resolution of the reference image Ga2 by the sixth predetermined conversion factor.

Here, reducing the level of resolution means to, for example, reduce the number of horizontal and vertical pixels of images to convert the images into images having low image quality that show the same object. The first to sixth predetermined conversion factors represent the numerical values obtained by dividing the number of horizontal pixels in the image after conversion by the number of horizontal pixels in the image before conversion and the numerical values obtained by dividing the number of vertical pixels in the image after conversion by the number of vertical pixels in the image before conversion. For example, the predetermined conversion factor is represented by $1/n$ (n is any number larger than one). For example, $1/n$ may be $\frac{1}{2}$. The predetermined conversion factors may be identical to or different from each other in the horizontal and vertical directions of the images. It is preferable that the first predetermined conversion factor be identical to the fourth predetermined conversion factor, the second predetermined conversion factor be identical to the fifth predetermined conversion factor, and the third conversion factor be identical to the sixth predetermined conversion factor.

In a case where the first to sixth predetermined conversion factors are $\frac{1}{2}$, the standard image Ga1, first to third converted standard images Gb1 to Gd1, reference image Ga2, and first to third converted reference images Gb2 to Gd2 may be, for example, the following images.

The standard image Ga1 and reference image Ga2 on the first layer are images including 640 pixels in the X direction and 480 pixels in the Y direction arranged in a grid pattern. The first converted standard image Gb1 and first converted reference image Gb2 on the second layer are images including 320 pixels in the X direction and 240 pixels in the Y direction arranged in a grid pattern. The second converted standard image Gc1 and second converted reference image Gc2 on the third layer are images including 160 pixels in the X direction and 120 pixels in the Y direction arranged in a grid pattern. The third converted standard image Gd1 and third converted reference image Gd2 on the fourth layer are images including 80 pixels in the X direction and 60 pixels in the Y direction arranged in a grid pattern.

In this case, the pixel value of the pixel at the coordinates $(x, y)$ in the images Gb1 and Gb2 on the second layer may be, for example, an average value of the pixel values of four pixels at the coordinates $(2x, 2y)$, $(2x+1, 2y)$, $(2x, 2y+1)$, and $(2x+1, 2y+1)$ in the images Ga1 and Ga2 on the first layer. The pixel values of the pixels at the coordinates $(x, y)$ in the images Gc1 and Gc2 on the third layer may be, for example, an average value of the pixel values of four pixels at the coordinates $(2x, 2y)$, $(2x+1, 2y)$, $(2x, 2y+1)$, and $(2x+1, 2y+1)$ in the images Gb1 and Gb2 on the second layer. Here, x and y represent an appropriate X coordinate and an appropriate Y coordinate, respectively.

The first to sixth predetermined conversion factors are not limited to ½ but may be set to a small value such as ⅓. In this case, an M-stage (M is an integer equal to or larger than two) reduction may be allowed for the image groups GR1 and GR2 generated by the image generation section 362. This may allow for reducing the computation amount of the search process, which may speed up the corresponding point search operation.

The first to sixth predetermined conversion factors may be set to a value larger than ½, such as 1/1.5. In this case, although the M stages (M is an integer equal to or larger than two) for the image groups GR1 and GR2 generated by the image generation section 362 increase, the accuracy of searching for a corresponding point in the corresponding point search operation is improved. This can result in an improvement in robustness of the corresponding point search operation.

The first to third predetermined conversion factors may vary and the fourth to sixth predetermined conversion factors may vary. For example, based on the first level of resolution of the standard image Ga1 and reference image Ga2, the conversion factor may be set to increase as the level of resolution of the image generated becomes lower. In this case, if the subject captured in the standard image Ga1 and reference image Ga2 includes distant and near views, robustness can be assured between the images having a low level of resolution through fine search for corresponding points, and the corresponding points can be searched for between the images having a high level of resolution at a high speed. This may allow for a balanced corresponding point search operation with assured robustness as well as higher speed.

(4) Details of Search Processes for Corresponding Points

Now, description is given of the details of the search process for corresponding points that is performed by the corresponding point search section 363, corresponding point search control section 364, and position determination section 365.

Figure 6:
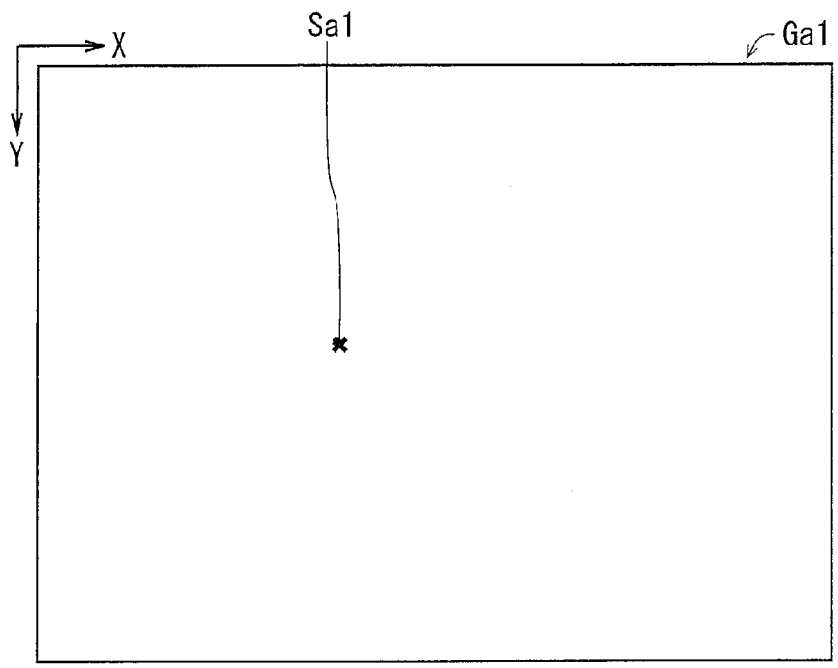
FIG. 6 is a diagram illustrating a manner of setting a standard point of a first layer.
Figure 7:
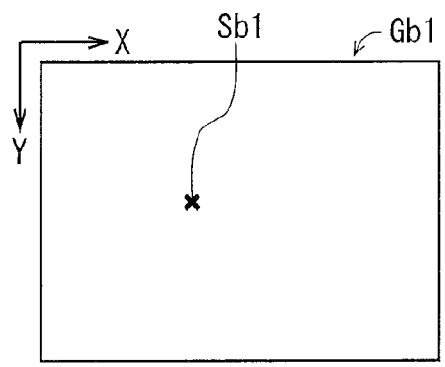
FIG. 7 is a diagram illustrating a manner of setting a standard point of a second layer.
Figure 8:
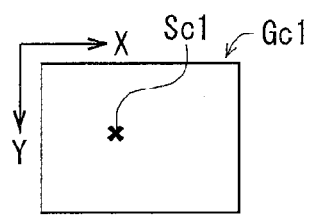
FIG. 8 is a diagram illustrating a manner of setting a standard point of a third layer.
Figure 9:
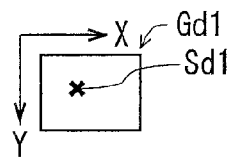
FIG. 9 is a diagram illustrating a manner of setting a standard point of a fourth layer.

First, as shown in FIG. 6, the first-layer standard point Sa1 is set in the standard image Ga1. Also, the second-layer standard point Sb1 is set in the first converted standard image Gb1 as shown in FIG. 7, the third-layer standard point Sc1 is set in the second converted standard image Gc1 as shown in FIG. 8, and the fourth-layer standard point Sd1 is set in the third converted standard image Gd1 as shown in FIG. 9. Then, the fourth-layer search process, third-layer search process, second-layer search process, and first-layer search process are performed in order. Hereinbelow, details of the fourth-layer search process, third-layer search process, second-layer search process, and first-layer search process are described in order.

<(4-1) Details of Fourth-Layer Search Process>

Figure 10:
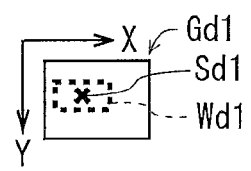
FIG. 10 is a diagram illustrating a manner of setting a standard area of the fourth layer.
Figure 11:
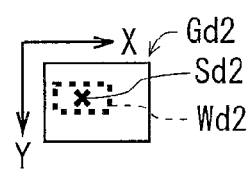
FIG. 11 is a diagram illustrating a manner of setting a reference area of the fourth layer.

In the fourth-layer search process, first, as shown in FIG. 10, a search window (also referred to as a fourth-layer standard area) Wd1 including the fourth-layer standard point Sd1 as a standard is set in the third converted standard image Gd1. The fourth-layer standard area Wd1 may be set with, for example, the fourth-layer standard point Sd1 being the center or centroid. As shown in FIG. 11, the position determination section 365 sets a fourth-layer search standard point Sd2 in the third converted reference image Gd2. Then, as shown in FIG. 11, a search window (also referred to as a fourth-layer reference area) Wd2 including the fourth-layer search standard point Sd2 as a standard is set in the third converted reference image Gd2. The fourth-layer reference area Wd2 may be set with, for example, the fourth-layer search standard point Sd2 being the center or centroid.

Figure 12:
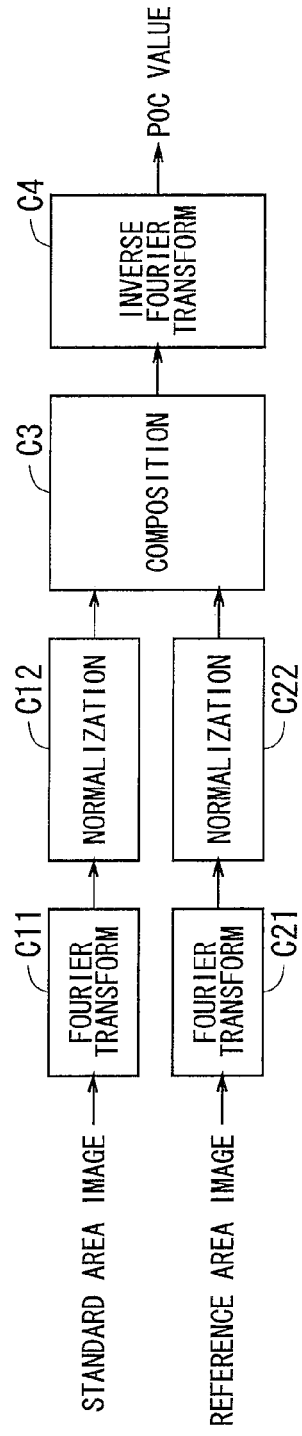
FIG. 12 is a diagram for describing a process of searching for a corresponding point in accordance with POC computation method.

Next, the corresponding point search section 363 searches the fourth-layer reference area Wd2 of the third converted reference image Gd2 for the fourth-layer corresponding point Cd2 corresponding to the fourth-layer standard point Sd1. In this case, the corresponding point search process using POC computation method, which is shown in FIG. 12, is performed.

Here, the fourth-layer standard area Wd1 and fourth-layer reference area Wd2 are each handled as an image area including a predetermined number $N_1$ of pixels arranged in the X direction and a predetermined number $N_2$ of pixels arranged in the Y direction. The above-mentioned image areas may be expressed by Math 1 below.

$$f(x,y), \text{size } N_1 \times N_2, x=-M_1, \ldots, M_1, y=-M_2, \ldots, M_2$$

$$g(x,y), \text{size } N_1 \times N_2, x=-M_1, \ldots, M_1, y=-M_2, \ldots, M_2 \quad \text{[Math 1]}$$

Here, f (x, y) in Math 1 above represents an area image (also referred to as a fourth-layer standard area image) included in the fourth-layer standard area Wd1, and g (x, y) in Math 1 above represents an area image (also referred to as a fourth-layer reference area image) included in the fourth-layer reference area Wd2. $N_1$ and $N_2$ may be set such that, for example, $N_1=2M_1+1$ and $N_2=2M_2+1$.

Then, the fourth-layer standard area image and the fourth-layer reference area image are subjected to two-dimensional Fourier transforms C11 and C21 using the computation expressions shown as Math 2 below.

$$F(u, v) = \sum_{x,y} f(x, y) W_{N_1}^{ux} W_{N_2}^{vy}$$

$$G(u, v) = \sum_{x,y} g(x, y) W_{N_1}^{ux} W_{N_2}^{vy}$$

$$\text{where, } W_N = E \times P\left(-j\frac{2\pi}{P}\right)$$

[Math 2]

In the note of Math 2 above, $N_1$ and $N_2$ are assigned to the subscript N of W, and u and v represent the frequency in the X direction and the frequency in the Y direction, respectively. Thus, (u, v) represents a two-dimensional spatial frequency. Here, the fourth-layer standard area image is broken down into frequency components through the two-dimensional Fourier transform C11, and the fourth-layer reference area image is broken down into frequency components through the two-dimensional Fourier transform C21. This achieves frequency information (also referred to as fourth-layer standard frequency information) including the information on a plurality of frequency components of the fourth-layer standard area image and frequency information (also referred to as fourth-layer reference frequency information) including the information on a plurality of frequency components of the fourth-layer reference area image.

Here, in a case where, for example, the search window has such a dimension as to include 33 pixels in the X direction and 17 pixels in the Y direction arranged in matrix, the entire area of the frequency components having a frequency u in the X direction is represented by DC components and 16 AC components having frequencies of 1 to 16. In this case, the entire area of the frequency components having a frequency v in the Y direction is represented by DC components and eight AC components having frequencies of 1 to 8. The AC components may be indicated by sine waves.

For the fourth-layer standard area image and fourth-layer reference area image formed in a rectangular shape including pixels of a number of a power of two in the X direction and Y direction, FFT is adoptable in the two-dimensional Fourier transforms C11 and C21. FFT means a fast Fourier transform characterized in butterfly computation. For example, in a case where the search window is formed to include 32 pixels in the X direction and 16 pixels in the Y direction, the entire area of the frequency components having the frequency u in the X direction is represented by DC components and 15 AC components having frequencies of 1 to 15. In this case, the entire area of the frequency components of the frequency v in the Y direction is represented by DC components and seven AC components having frequencies of 1 to 7. The computation results of the two-dimensional Fourier transforms C11 and C21 may be output in the form of complex numbers having a real part Re (u, v) and an imaginary part Im (u, v).

The computed information storage section 366 stores the computed information regarding the fourth-layer standard frequency information and fourth-layer reference frequency information obtained through Fourier transforms C11 and C21. The computed information may include at least part of the fourth-layer standard frequency information and the fourth-layer reference frequency information.

The fourth-layer standard frequency information and fourth-layer reference frequency information, which have been obtained through the Fourier transforms C11 and C21, are subjected to normalizations C12 and C22 for removing image amplitude components by using the computation expressions shown as Math 3 below. As a result, the phase information (also referred to as fourth-layer standard phase information) on each spatial frequency is extracted from the fourth-layer standard frequency information, and the phase information (also referred to as fourth-layer reference phase information) on each spatial frequency is extracted from the fourth-layer reference frequency information.

$$F'(u, v) = \frac{F(u, v)}{|F(u, v)|}, \ G'(u, v) = \frac{G(u, v)}{|G(u, v)|}$$ [Math 3]

After the normalizations C12 and C22, a composition C3 using a computation expression shown as Math 4 below is performed. As a result, a phase difference (also referred to as a fourth-layer phase difference) is calculated for each spatial frequency based on the fourth-layer standard phase information and the fourth-layer reference phase information. Here, Wt (u, v) shown in Math 4 represents a weighting coefficient to be multiplied as required. In this embodiment, the weighting coefficient Wt (u, v) may be set to one irrespective of the spatial frequency (u, v).

$$R(u,v) = W_t(u,v) \cdot F'(u,v) \cdot \overline{G'(u,v)}$$ [Math 4]

Then, a two-dimensional inverse Fourier transform C4 using the computation expression shown as Math 5 below is performed. A correlation computation between images is thus carried out and the results (POC value) thereof are output.

$$r(u, v) = \frac{1}{N_1 N_2} \sum_{x,y} R(u, v) W_{N_1}^{ux} W_{N_2}^{vy}$$ [Math 5]

Figure 13:
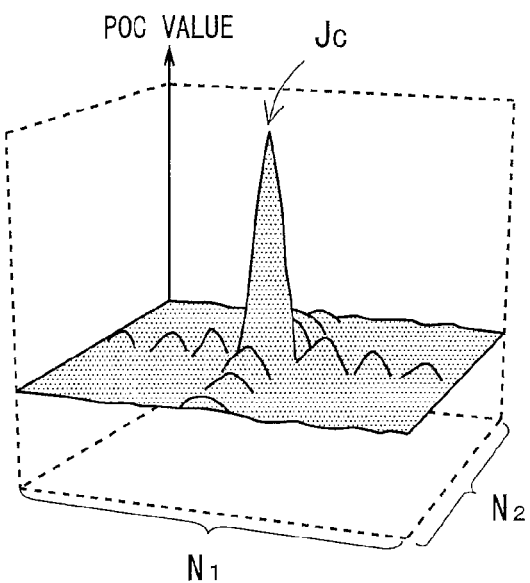
FIG. 13 is a diagram illustrating the distribution of POC values.

Through the processes above, the computation results (POC value) indicating the correlation between the fourth-layer standard area image and the fourth-layer reference area image are obtained, and accordingly, results (distribution of POC values) as shown in, for example, FIG. 13 are obtained.

With reference to FIG. 13, the POC value is large in the spot having a high correlation in the rectangular image area including a predetermined number $N_1$ of pixels arranged along the X direction and a predetermined number $N_2$ of pixels arranged along the Y direction. In the fourth-layer reference area image, the position corresponding to a peak Jc of the POC value is the corresponding point Cd2 that corresponds to the fourth-layer standard point Sd1 in the third converted reference image Gd2.

As described above, the corresponding point search section 363 is capable of detecting the position of the fourth-layer corresponding point Cd2 in the third converted reference image Gd2 through the fourth-layer search process using POC computation method. In other words, the corresponding point search section 363 is capable of detecting the fourth-layer corresponding point Cd2 corresponding to the fourth-layer standard point Sd1 based on the fourth-layer standard phase information on each frequency component and the fourth-layer reference phase information on each frequency component.

<(4-2) Details of Third-Layer Search Process>

Figure 14:
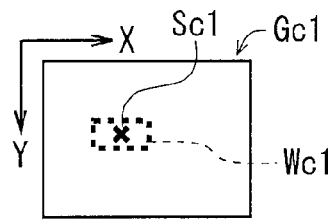
FIG. 14 is a diagram illustrating a manner of setting a standard area of the third layer.
Figure 15:
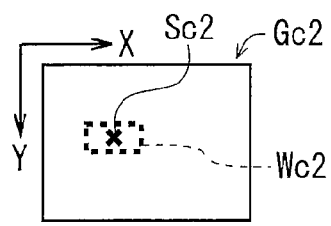
FIG. 15 is a diagram illustrating a manner of setting a reference area of the third layer.

In the third-layer search process, as shown in FIG. 14, first, a search window (also referred to as a third-layer standard area) Wc1 including the third-layer standard point Sc1 as a standard is set in the second converted standard image Gc1. The third-layer standard area Wc1 may be set with, for example, the third-layer standard point Sc1 being the center or centroid. Meanwhile, as shown in FIG. 15, the position determination section 365 sets a third-layer search standard point Sc2 in the second converted reference image Gc2. Then, as shown in FIG. 15, a search window (also referred to as a third-layer reference area) Wc2 including the third-layer search standard point Sc2 as a standard is set in the second converted reference image Gc2. The third-layer reference area Wc2 may be set with, for example, the third-layer search standard point Sc2 being the center or centroid.

Next, the corresponding point search section 363 searches the third-layer reference area Wc2 of the second converted reference image Gc2 for the third-layer corresponding point Cc2 corresponding to the third-layer standard point Sc1. In this case, the corresponding point search process using POC computation method, which is shown in FIG. 12, is performed similarly to the fourth-layer search process. In the corresponding point search process on the third layer, the third-layer standard area Wc1 and the third-layer reference area Wc2 are employed in place of the fourth-layer standard area Wd1 and fourth-layer reference area Wd2 in the corresponding point search process on the fourth layer. Description is mainly given below with respect to the differences in the corresponding point search process on the third layer from the corresponding point search process on the fourth layer.

Here, f (x, y) in Math 1 above represents an area image (also referred to as a third-layer standard area image) included in the third-layer standard area Wc1, and g (x, y) in Math 1 above represents an area image (also referred to as a third-layer reference area image) included in the third-layer reference area Wc2.

First, the two-dimensional Fourier transforms C11 and C21 using the computation expression shown as Math 2 above are performed on the third-layer standard area image and the third-layer reference area image. Here, the third-layer standard area image is broken down into frequency components, and the third-layer reference area image is broken down into frequency components. As a result, the frequency information (also referred to as third-layer standard frequency information) including the information on a plurality of frequency components of the third-layer standard area image is obtained, and the frequency information (also referred to as third-layer reference frequency information) including the information on a plurality of frequency components of the third-layer reference area image is obtained.

It is to be noted that the two-dimensional Fourier transforms C11 and C21 reuse the fourth-layer computed information stored in the computed information storage section 366 and thus omit part of the computation. This may allow for reducing a computation amount.

Specifically, at least part of the fourth-layer standard frequency information and fourth-layer reference frequency information included in the fourth-layer computed information is used as part of the third-layer frequency information for use in the computations after the normalizations C12 and C22. The third-layer frequency information includes the third-layer standard frequency information and the third-layer reference frequency information. In other words, part of the information for third-layer computation is obtained from the fourth-layer computed information.

Meanwhile, the other of the information for third-layer computation is calculated through the two-dimensional Fourier transforms C11 and C21 based on the third-layer standard area image and the third-layer reference area image.

The computed information storage section 366 stores the computed information that has been reused and the computed information regarding the third-layer standard frequency information and third-layer reference frequency information obtained through the Fourier transforms C11 and C21. The computed information may include at least part of the third-layer standard frequency information and the third-layer reference frequency information.

Then, the normalizations C12 and C22 for removing image amplitude components are performed on the third-layer standard frequency information and the third-layer reference frequency information by using the computation expressions shown as Math 3 above. As a result, the phase information (also referred to as third-layer standard phase information) on each spatial frequency is extracted from the third-layer standard frequency information, and the phase information (also referred to as third-layer reference phase information) on each spatial frequency is extracted from the third-layer reference frequency information.

After the normalizations C12 and C22 the composition C3 using the computation expression shown as Math 4 above is performed. As a result, a phase difference (also referred to as a third-layer phase difference) on each spatial frequency is calculated based on the third-layer standard phase information and the third-layer reference phase information.

Then, the two-dimensional inverse Fourier transform C4 using the computation expression shown as Math 5 above is performed. Correlation computations between images are thus performed and the results (POC value) thereof are output.

Through the processes above, the computation results (POC value) indicating the correlation between the third-layer standard area image and the third-layer reference area image are obtained, and accordingly, results (distribution of POC values) shown in, for example, FIG. 13 are obtained. In the third-layer reference area image, the position corresponding to the peak Jc of the POC value is the corresponding point Cc2 that corresponds to the third-layer standard point Sc1 in the second converted reference image Gc2.

As described above, the corresponding point search section 363 is capable of detecting the position of the third-layer corresponding point Cc2 in the second converted reference image Gc2 through the third-layer search process using POC computation method. In other words, the corresponding point search section 363 is capable of detecting the third-layer corresponding point Cc2 corresponding to the third-layer standard point Sc1 based on the third-layer standard phase information on each frequency component and the third-layer reference phase information on each frequency component.

<(4-3) Details of Second-Layer Search Process>

In the second-layer search process, as shown in FIG. 16, first, a search window (also referred to as a second-layer standard area) Wb1 including the second-layer standard point Sb1 as a standard is set in the first converted standard image Gb1. The second-layer standard area Wb1 may be set with, for example, the second-layer standard point Sb1 being the center or centroid. Meanwhile, as shown in FIG. 17, the position determination section 365 sets a second-layer search standard point Sb2 in the first converted reference image Gb2. Then, as shown in FIG. 17, a search window (also referred to as a second-layer reference area) Wb2 including the second-layer search standard point Sb2 as a standard is set in the first converted reference image Gb2. The second-layer reference area Wb2 may be set with, for example, the second-layer search standard point Sb2 being the center or centroid.

Then, the corresponding point search section 363 searches the second-layer reference area Wb2 of the first converted reference image Gb2 for the second-layer corresponding point Cb2 corresponding to the second-layer standard point Sb1. In this case, as in the third-layer search process, the corresponding point search process using POC computation method shown in FIG. 12 is performed. The second-layer corresponding point search process employs the second-layer standard area Wb1 and the second-layer reference area Wb2 in place of the third-layer standard area Wc1 and third-layer reference area Wc2 in the third-layer corresponding point search process. Description is mainly given below with respect to the differences in the corresponding point search process on the second layer from the corresponding point search process on the third layer.

Here, f (x, y) in Math 1 above represents an area image (also referred to as a second-layer standard area image) included in the second-layer standard area Wb1, and g (x, y) in Math 1 above represents an area image (also referred to as a second-layer reference area image) included in the second-layer reference area Wb2.

First, the two-dimensional Fourier transforms C11 and C21 using the computation expression shown as Math 2 above are performed on the second-layer standard area image and the second-layer reference area image. Here, the second-layer standard area image is broken down into frequency components, and the second-layer reference area image is broken down into frequency components. As a result, the frequency information (also referred to as second-layer standard frequency information) including a plurality of frequency components of the second-layer standard area image is obtained, and the frequency information (also referred to as second-layer reference frequency information) including a plurality of frequency components of the second-layer reference area image is obtained.

It is to be noted that the two-dimensional Fourier transforms C11 and C21 reuse the third-layer computed information stored in the computed information storage section 366 and thus omit part of the computation. This may allow for reducing a computation amount.

Specifically, at least part of the third-layer standard frequency information and third-layer reference frequency information included in the third-layer computed information is used as part of the second-layer frequency information for use in the computations after the normalizations C12 and C22. The second-layer frequency information includes the second-layer standard frequency information and the second-layer reference frequency information. In other words, part of the information for second-layer computation is obtained from the third-layer computed information.

Meanwhile, the other of the information for second-layer computation is calculated through the two-dimensional Fourier transforms C11 and C21 based on the second-layer standard area image and the second-layer reference area image.

The computed information storage section 366 stores the computed information that has been reused and the computed information regarding the second-layer standard frequency information and second-layer reference frequency information obtained through the Fourier transforms C11 and C21. The computed information may include at least part of the second-layer standard frequency information and the second-layer reference frequency information.

Then, the normalizations C12 and C22 for removing image amplitude components are performed on the second-layer standard frequency information and the second-layer reference frequency information by using the computation expressions shown as Math 3 above. As a result, the phase information (also referred to as second-layer standard phase information) on each spatial frequency is extracted from the second-layer standard frequency information, and the phase information (also referred to as second-layer reference phase information) on each spatial frequency is extracted from the second-layer reference frequency information.

After the normalizations C12 and C22, the composition C3 using the computation expression shown as Math 4 above is performed. As a result, a phase difference (also referred to as a second-layer phase difference) on each spatial frequency is calculated based on the second-layer standard phase information on each spatial frequency and the second-layer reference phase information on each spatial frequency.

Then, the two-dimensional inverse Fourier transform C4 using the computation expression shown as Math 5 above is performed. A correlation computation between images is thus performed and the results (POC value) thereof are output.

Through the processes above, the computation results (POC value) indicating the correlation between the second-layer standard area image and the second-layer reference area image are obtained, and accordingly, results (distribution of POC values) shown in, for example, FIG. 13 are obtained. In the second-layer reference area image, the position corresponding to the peak Jc of the POC value is the corresponding point Cb2 that corresponds to the second-layer standard point Sb1 in the first converted reference image Gd2.

As described above, the corresponding point search section 363 is capable of detecting the position of the second-layer corresponding point Cb2 in the first converted reference image Gb2 through the second-layer search process using POC computation method. In other words, the corresponding point search section 363 is capable of detecting the second-layer corresponding point Cb2 corresponding to the second-layer standard point Sb1 based on the second-layer standard phase information on each frequency component and the second-layer reference phase information on each frequency component.

<(4-4) Details of First-Layer Search Process>

Figure 18:
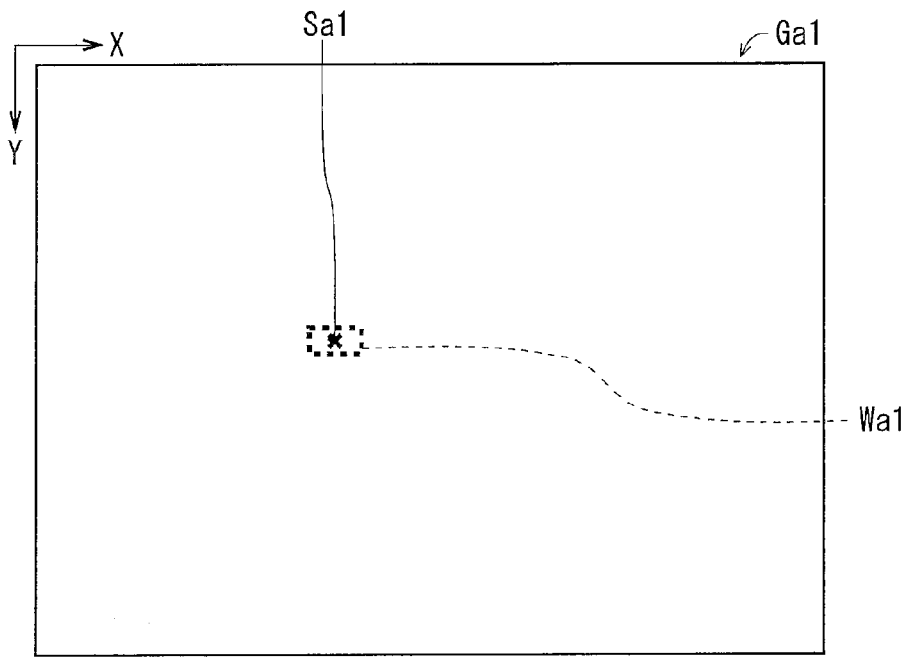
FIG. 18 is a diagram illustrating a manner of setting a standard area of the first layer.
Figure 19:
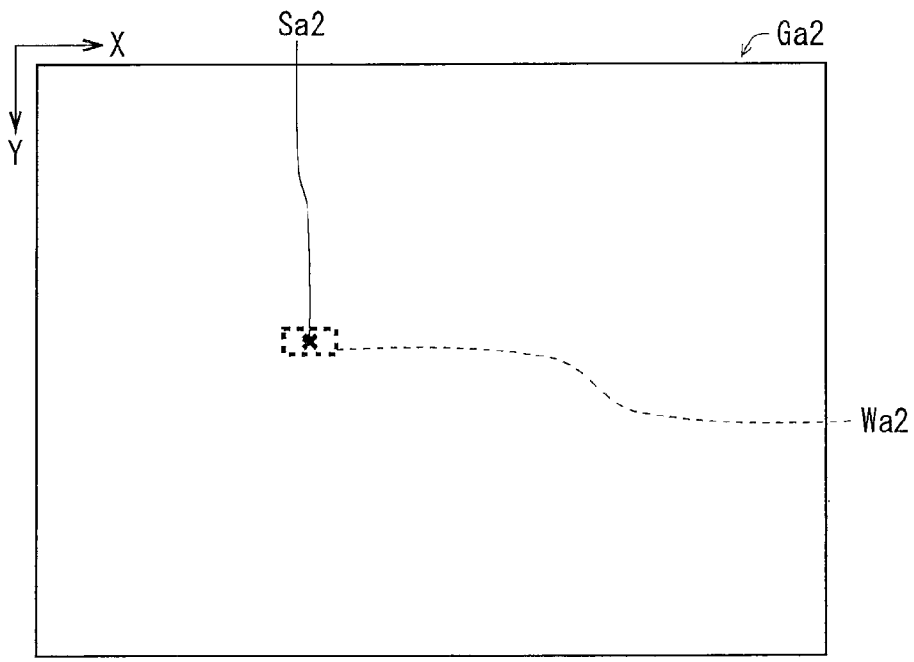
FIG. 19 is a diagram illustrating a manner of setting a reference area of the first layer.

In the first-layer search process, as shown in FIG. 18, first, a search window (also referred to as a first-layer standard area) Wa1 including the first-layer standard point Sa1 as a standard is set in the standard image Ga. The first-layer standard area Wa1 may be set with, for example, the first-layer standard point Sa1 being the center or centroid. Meanwhile, as shown in FIG. 19, the position determination section 365 sets a first-layer search standard point Sa2 in the reference image Ga2. Then, as shown in FIG. 19, a search window (also referred to as a first-layer reference area) Wa2 including the first-layer search standard point Sa2 as a standard is set in the reference image Ga2. The first-layer reference area Wa2 may be set with, for example, the first-layer search standard point Sa2 being the center or centroid.

Then, the corresponding point search section 363 searches the first-layer reference area Wa2 of the reference image Ga2 for the first-layer corresponding point Ca2 corresponding to the first-layer standard point Sa1. In this case, as in the second-layer search process, the corresponding point search process using POC computation method shown in FIG. 12 is performed. The first-layer corresponding point search process employs the first-layer standard area Wa1 and the first-layer reference area Wa2 in place of the second-layer standard area Wb1 and second-layer reference area Wb2 in the second-layer corresponding point search process. Description is mainly given below with respect to the differences in the first-layer corresponding point search process from the second-layer corresponding point search process.

Here, f (x, y) in Math 1 above represents an area image (also referred to as a first-layer standard area image) included in the first-layer standard area Wa1, and g (x, y) in Math 1 above represents an area image (also referred to as a first-layer reference area image) included in the first-layer reference area Wa2.

First, the two-dimensional Fourier transforms C11 and C21 using the computation expression shown as Math 2 above are performed on the first-layer standard area image and the first-layer reference area image. Here, the first-layer standard area image is broken down into frequency components, and the first-layer reference area image is broken down into frequency components. As a result, the frequency information (also referred to as first-layer standard frequency information) including a plurality of frequency components of the first-layer standard area image is obtained, and the frequency information (also referred to as first-layer reference frequency information) including a plurality of frequency components of the first-layer reference area image is obtained.

It is to be noted that the two-dimensional Fourier transforms C11 and C21 reuse the second-layer computed information stored in the computed information storage section 366 and thus omit part of the computation. This may allow for reducing a computation amount.

Specifically, part of the second-layer standard frequency information and second-layer reference frequency information included in the computed information is used as part of the first-layer frequency information for use in the computations after the normalizations C12 and C22. The first-layer frequency information may include the first-layer standard frequency information and the first-layer reference frequency information. In other words, part of the information for first-layer computation is obtained from the second-layer computed information.

Meanwhile, the other of the information for first-layer computation is calculated through the two-dimensional Fourier transforms C11 and C21 based on the first-layer standard area image and the first-layer reference area image.

Then, the normalizations C12 and C22 to remove image amplitude components are performed on the first-layer standard frequency information and the first-layer reference frequency information by using the computation expressions shown as Math 3 above. As a result, the phase information (also referred to as first-layer standard phase information) on each spatial frequency is extracted from the first-layer standard frequency information, and the phase information (also referred to as first-layer reference phase information) on each spatial frequency is extracted from the first-layer reference frequency information.

After the normalizations C12 and C22, the composition C3 using the computation expression shown as Math 4 above is performed. As a result, a phase difference (also referred to as a first-layer phase difference) on each spatial frequency is calculated based on the first-layer standard phase information on each spatial frequency and the first-layer reference phase information on each spatial frequency.

Then, the two-dimensional inverse Fourier transform C4 using the computation expression shown as Math 5 above is performed. A correlation computation between images is thus performed and the results (POC value) thereof are output.

Through the processes above, the computation results (POC value) indicating the correlation between the first-layer standard area image and the first-layer reference area image are obtained, and accordingly, results (distribution of POC values) shown in, for example, FIG. 13 are obtained. In the first-layer reference area image, the position corresponding to the peak Jc of the POC value is the corresponding point Ca2 that corresponds to the first-layer standard point Sa1 in the reference image Ga2.

As described above, the corresponding point search section 363 is capable of detecting the position of the first-layer corresponding point Ca2 in the reference image Ga2 through the first-layer search process using POC computation method. In other words, the corresponding point search section 363 is capable of detecting the first-layer corresponding point Ca2 corresponding to the first-layer standard point Sa1 based on the first-layer standard phase information on each frequency component and the first-layer reference phase information on each frequency component. Further, a deviation amount (also referred to as a parallax) between the position of the first-layer standard point Sa1 in the standard image Ga1 and the position of the first-layer corresponding point Ca2 in the reference image Ga2 may be detected.

(5) Method of Reusing Computed Information in Search Process

The methods of reusing the computed information are similar in the third-layer search process, second-layer search process, and first-layer search process. Thus, as an example, description is given here with respect to the method of reusing the computed information in the third-layer search process.

The methods of reusing the computed information in the third-layer search process include the method of reusing part of the third-layer standard frequency information (also referred to as third-layer standard reuse method) and the method of reusing part of the third-layer reference frequency information (also referred to as third-layer reference reuse method). The third-layer standard reuse method is similar to the third-layer reference reuse method. For this reason, as an example, description is given here with respect to the third-layer standard reuse method. In other words, as an example, description is given with respect to the method of reusing part of the fourth-layer standard frequency information as part of the third-layer standard frequency information. Here, a predetermined conversion factor is ½.

Figure 20:
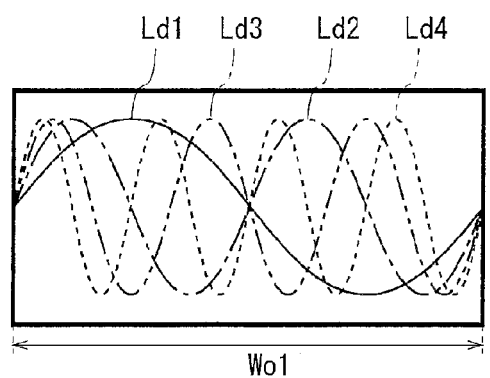
FIG. 20 is a diagram for describing a method of reusing computed information.
Figure 21:
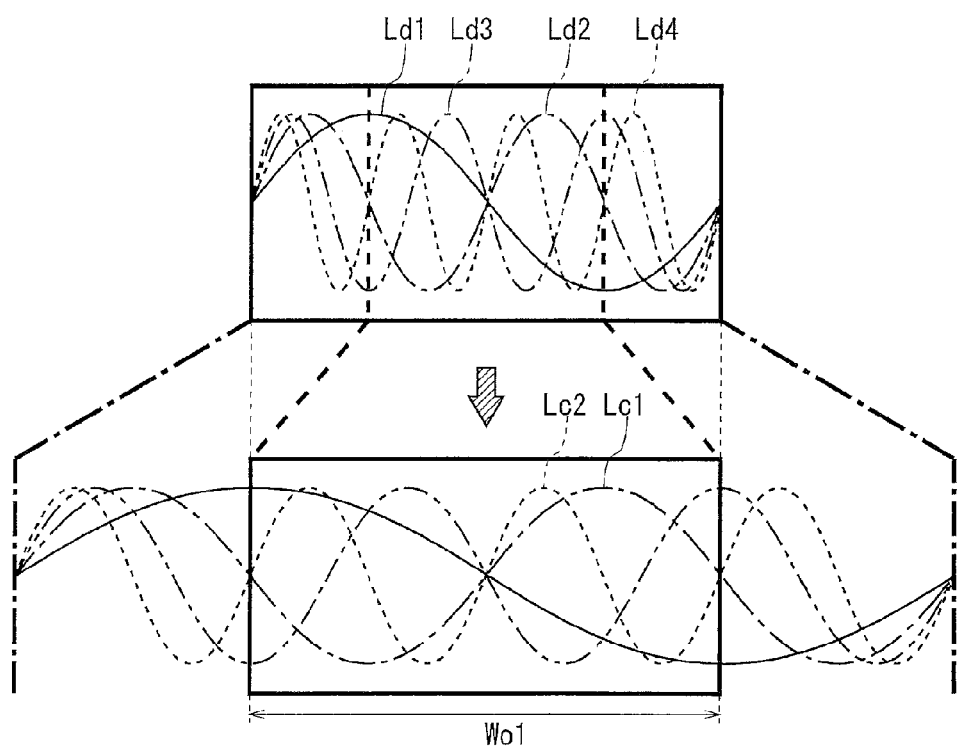
FIG. 21 is a diagram for describing the method of reusing the computed information.

FIGS. 20 and 21 are diagrams for describing the third-layer standard reuse method. The third-layer standard frequency information includes the third-layer amplitude information and third-layer standard phase information on the two-dimensional spatial frequency (u, v). First, for the simplification of description, description is given by focusing on the frequency information in one dimension including the X direction.

FIG. 20 schematically shows the fourth-layer standard frequency information. Here, for example, the fourth-layer standard area Wd1 and third-layer standard area Wc1 have such a dimension to include 33 pixels in the X direction and 17 pixels in the Y direction arranged in matrix. In this case, the frequency u for the X direction may be represented by 16 AC components having frequencies of 1 to 16. It is to be noted that FIG. 20 shows the four AC components having frequencies of one to four, for simplicity of the drawing. In FIG. 20, the lateral width by the rectangular thick frame shows a width Wo1 in the X direction of the fourth-layer standard area Wd1, and the vertical direction by the rectangular thick frame shows the amplitudes of four AC components having frequencies of one to four.

Specifically, in FIG. 20, the AC component having a frequency of one is shown by a solid curve Ld1, the AC component having a frequency of two is shown by a dashed curve Ld2, the AC component having a frequency of three is shown by a chain double-dashed curve Ld3, and the AC component having a frequency of four is shown by a broken curve Ld4.

FIG. 21 shows the relationship between the fourth-layer standard frequency information and the third-layer standard frequency information. The upper portion of FIG. 21 shows four AC components having frequencies of one to four of the fourth-layer standard frequency information shown in FIG. 20. The lower portion of FIG. 21 shows two AC components having frequencies of one and two of the third-layer standard frequency information. Specifically, in the lower portion of FIG. 21, the AC component having a frequency of one is shown by a dashed curve Lc1, and the AC component having a frequency of two is shown by a broken curve Lc2.

Here, the fourth-layer standard area image is enlarged into an area image including pixels increased two-fold in both the X direction and the Y direction on the third-layer second converted standard image Gc1. Thus, the AC components of the third-layer standard frequency information are equal to the AC components of the fourth-layer standard frequency information, which are increased two-fold in the X direction.

In FIG. 21, thick broken lines and thick dashed lines show the correspondence relationship between the range in the X direction of the fourth-layer standard area image and the range in the X direction of the third-layer standard area image. In FIG. 21, the lateral width by the rectangular thick frame in the lower portion shows the width Wo1 in the X direction of the third-layer standard area Wc1, and the vertical direction by the rectangular thick frame shows the amplitudes of two AC components having frequencies of one and two.

As shown in FIG. 21, the AC component having a frequency of four on the fourth layer may correspond to the AC component having a frequency of two on the third layer, and the AC component having a frequency of two on the fourth layer may correspond to the AC component having a frequency of one on the third layer.

As described above, the AC component having a frequency of four on the fourth layer and the AC component having a frequency of two on the third layer do not completely coincide with each other, which are similar to each other. The AC component having a frequency of two on the fourth layer and the AC component having a frequency of one on the third layer do not completely coincide with each other, which are both similar to each other. This allows for reuse of part of the fourth-layer standard frequency information, which has been calculated through the computation in the fourth-layer search process, in the third-layer search process.

Specifically, if a predetermined conversion factor is $1/n$, the relationship of Expression (6) can be held between a fourth-layer frequency $u_4$ and a third-layer frequency $u_3$.

$$u_3 = u_4/n \qquad (6)$$

For example, if a predetermined conversion factor $1/n$ is $\frac{1}{2}$, the information of the AC components when the fourth-layer frequency $u_4$ is 2, 4, 6, 8, 10, 12, 14, and 16 may be reused as the information of the AC components when the third-layer frequency $u_3$ is 1 to 8. In other words, the information of the AC components when the fourth-layer frequency $u_4$ is an even number may be reused as the information of the third-layer AC component having the frequency $u_3$ that is $\frac{1}{2}$ of the frequency $u_4$. In contrast, as to the information of the AC components when the third-layer frequency $u_3$ is 9 to 16, the fourth-layer standard frequency information does not include the information of the corresponding AC components. Thus, it suffices that the information of the AC components when the third-layer frequency $u_3$ is 9 to 16 is newly calculated through the Fourier transform targeted for the third-layer standard area image. Therefore, in the X direction, the computation amount necessary for the Fourier transform, which is targeted for the third-layer standard area image, may be reduced to about $\frac{1}{2}$.

As shown in FIG. 21, the phase deviates by $u_3 \times \pi$ between the AC component having an even-numbered frequency for the fourth-layer standard area image and the AC component having $\frac{1}{2}$ of the above-mentioned frequency for the third-layer standard area image. Thus, for example, in the reuse of the information on the AC component having the fourth-layer frequency $u_4$ as the information on the AC component having the frequency $u_3$ that is $\frac{1}{2}$ of the above-mentioned frequency, a phase $u_4\theta$ of the AC component having the fourth-layer frequency $u_4$ may be corrected by a deviation amount of $u_3 \times \pi$. Consequently, it suffices that the phase of the AC component for the third-layer frequency $u_3$ is $2 \times u_4\theta - u_3 \times \pi$. In other words, in the third-layer search process, in a case where the fourth-layer standard phase information is obtained from the fourth-layer computed information and is used for the computation, the information, which is obtained through a correction of the fourth-layer standard phase information by the deviation amount $u_3 \times \pi$ of the phase corresponding to a reduction in level of resolution, is used in the computation. This may lead to an improvement in accuracy of searching for a corresponding point in the search process.

As in the description for the X direction above, when attention is focused on the frequency information in one dimension including the Y direction, the frequency v in the Y direction may be represented by eight AC components having frequencies of one to eight. The information of the AC components when the fourth-layer frequency $v_4$ is 2, 4, 6, and 8 may be reused as the information of the AC components when the third-layer frequency $v_3$ is 1 to 4. In other words, the information of the AC components when the fourth-layer frequency v4 is an even number may be each reused as the information of the third-layer AC components having the frequency $v_3$ being $\frac{1}{2}$ of the frequency $v_4$. In contrast, as to the information of the AC components when the third-layer frequency $v_3$ is five to eight, the fourth-layer standard frequency information does not include the information of the corresponding AC components. For this reason, the information of the AC components when the third-layer frequency $v_3$ is five to eight may be newly calculated by the Fourier transform targeted for the third-layer standard area image. Thus, in the Y direction, the computation amount necessary for the Fourier transform targeted for the third-layer standard area image may be reduced to about $\frac{1}{2}$.

Also in the Y direction, in reuse of the information of the AC components having a fourth-layer even-numbered frequency as the information of the AC components having $\frac{1}{2}$ of the above-mentioned frequency, a phase $v_4\theta$ of the AC component of the fourth-layer frequency $v_4$ may be corrected by the deviation amount $v_3 \times \pi$. In this case, the phase of the AC component of the third-layer frequency $v_3$ may be $2 \times v_4\theta - v_3 \times \pi$. This may lead to an improvement in accuracy of searching for a corresponding point in the search process.

The information of the frequency components of the spatial frequency $(u, v)$ in two dimensions including the X direction and Y direction corresponds to the resultant obtained by combining the frequency component having the frequency u for the X direction and the frequency component having the frequency v for the Y direction.

In the third-layer search process, thus, the fourth-layer standard frequency information on the spatial frequency $(u_4, v_4)$ obtained from the fourth-layer computed information is used as the standard frequency information on the spatial frequency $(u_3, v_3)$ obtained by multiplying the spatial frequency $(u_4, v_4)$ by a predetermined conversion factor. Specifically, if the predetermined conversion factor is $\frac{1}{2}$, the information of the frequency component regarding the fourth-layer standard area image for the spatial frequency $(u_4, v_4)$ having even-numbered frequencies u4 and v4 may be reused as the information of the frequency component regarding the third-layer standard area image for the spatial frequency $(u_3, v_3)$ being a half of the frequency above. The above-mentioned information reuse may reduce the computation amount necessary for the Fourier transform targeted for the third-layer standard area image to about $\{1-(1/2)^2\}$.

In the reuse, it suffices that for the X direction, the phase $u_4\theta$ of the AC component having the fourth-layer frequency $u_4$ is corrected by the deviation amount $u_3 \times \pi$ such that the phase of the AC component for the third-layer frequency $u_3$ is $2 \times u_4\theta - u_3 \times \pi$, as described above. Also, it suffices that for the Y direction, the phase $v_4\theta$ of the AC component having the fourth-layer frequency $v_4$ is corrected by the deviation amount $v_3 \times \pi$ such that the phase of the AC component for the third-layer frequency $v_3$ is $2 \times v_4\theta - v_3 \times \pi$.

In other words, in the third-layer search process, in the case where the fourth-layer standard phase information is obtained from the fourth-layer computed information and is used in computation, the information for computation is obtained through a correction of the fourth-layer standard phase information by the deviation amounts $(u_3 \times \pi, v_3 \times \pi)$ of the phase corresponding to a reduction in level of resolution. On this occasion, in the third-layer search process, the fourth-layer standard frequency information on the spatial frequency $(u_4, v_4)$ obtained from the fourth-layer computed information is used as the standard frequency information on the frequency $(u_3, v_3)$ obtained by multiplying the frequency $(u_4, v_4)$ by a predetermined conversion factor. This determines the correspondence relationship between the frequencies of the information to be reused in accordance with a predetermined conversion factor for a reduction in level of resolution, which may make it easy to design the computation in the corresponding point search process.

The information to be reused in the third-layer search process may be included in the fourth-layer computed information stored in the computed information storage section 366 in the fourth-layer search process. From such a viewpoint that the storage capacity necessary for the computed information storage section 366 is reduced as much as possible, the fourth-layer computed information preferably does not include the information not to be reused in the third-layer search process.

(6) <Measurement of Distance Using Principle of Triangulation

FIG. 22 schematically shows the method of calculating a distance from the first and second cameras 1 and 2 to a subject OB1 based on the principle of triangulation, from the correspondence relationship between the pixels between the standard image Ga1 and reference image Ga2.

In a case where the deviation amount (parallax) between the first-layer standard point Sa1 and first-layer corresponding point Ca2 is Δd between the standard image Ga1 and reference image Ga2, a distance D from the first and second cameras 1 and 2 to the subject OB1 may be calculated from Expression (7) below.

$$D = fB/\Delta d \quad (7)$$

In Expression (7), the baseline length of the camera is B, and the focal length of the lenses of the first and second cameras 1 and 2 is f.

(7) Flow of Corresponding Point Search Operation

Figure 24:
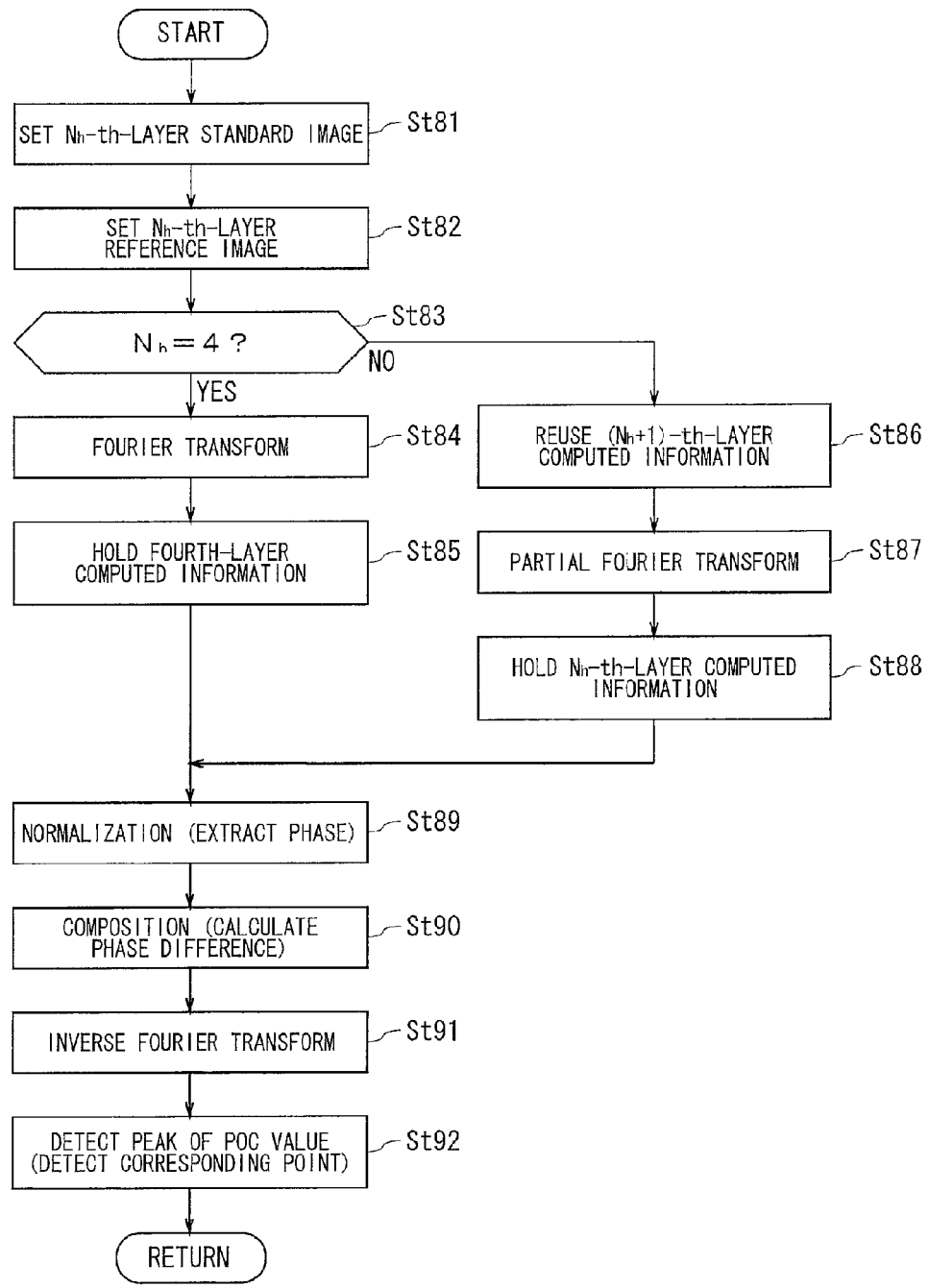
FIG. 24 is another flowchart illustrating the operational flow of the corresponding point search operation.

FIGS. 23 and 24 are flowcharts illustrating an operational flow of a corresponding point search operation according to this embodiment. This flow may be achieved through, for example, control by the controller 36.

First, in Step St1 of FIG. 23, the image acquisition section 361 obtains data M1 of a first image from the first camera 1.

In Step St2, the image acquisition section 361 obtains data M2 of a second image from the second camera 2.

In Step St3, the image generation section 362 sequentially reduces the level of resolution of the first image serving as a standard image Ga1 in accordance with a predetermined conversion factor, to thereby generate a first converted standard image Gb1, a second converted standard image Gc1, and a third converted standard image Gd1. The image generation section 362 sequentially reduces the level of resolution of the second image serving as a reference image Ga2 in accordance with the predetermined conversion factor, to thereby generate a first converted reference image Gb2, a second converted reference image Gc2, and a third converted reference image Gd2.

In Step St4, the corresponding point search section 363 sets a first-layer standard point Sa1 in the standard image Ga1. The corresponding point search section 363 also sets a second-layer standard point Sb1 in the first converted standard image Gb1, sets a third-layer standard point Sc1 in the second converted standard image Gc1, and sets a fourth-layer standard point Sd1 in the third converted standard image Gd1. As described above, the same part of the subject as that in the first-layer standard point Sa1 is captured in the second-layer standard point Sb1, third-layer standard point Sc1, and fourth-layer standard point Sd1. In the first processing of Step St4, for example, the upper left pixel in the standard image Ga1 may be set as the first-layer standard point Sa1. Then, every time the flow returns to Step St4 from Step St11, the next pixel included in the standard image Ga1 may be set as the first-layer standard point Sa1. As a result, all the pixels included in the standard image Ga1 may be sequentially set as the first-layer standard point Sa1.

In Step St5, the corresponding point search section 363 sets a numeric value $N_h$ ($N_h$ is an integer of one to four) for specifying, among first- to fourth-layer image groups 1Hy to 4Hy, an image group on such a layer as to be subjected to the corresponding point search process to four.

In Step St6, the corresponding point search section 363 specifies an $N_h$-th-layer image group $N_h$Hy to be subjected to the corresponding point search process among the first- to fourth-layer image groups 1Hy to 4Hy.

In Step St7, the position determination section 365 determines the $N_h$-th-layer search standard point. In Step St7, for example, if $N_h$=4, a fourth-layer search standard point Sd2 is determined in the third converted reference image Gd2. For example, if $N_h$=3, a third-layer search standard point Sc2 is determined in the second converted reference image Gc2 based on the position of a fourth-layer corresponding point Cd2 in the third converted reference image Gd2. For example, if $N_h$=2, a second-layer search standard point Sb2 is determined in the first converted reference image Gb2 based on the position of a third-layer corresponding point Cc2 in the second converted reference image Gc2. For example, if $N_h$=1, a first-layer search standard point Sa2 is determined in the reference image Ga2 based on the position of the second-layer corresponding point Cb2 in the first converted reference image Gb2.

In Step St8, the corresponding point search section 363 may perform the operational flow of the corresponding point search process shown in FIG. 24. Now, the operational flow shown in FIG. 24 is described.

In Step St81 of FIG. 24, an $N_h$-th-layer standard area is set based on the $N_h$-th-layer standard point set in Step St4. For example, if $N_h$=4, a fourth-layer standard area Wd1 including the fourth-layer standard point Sd1 as a standard is set in the third converted standard image Gd1. If $N_h$=3, a third-layer standard area Wc1 including the third-layer standard point Sc1 as a standard is set in the second converted standard image Gc1. If $N_h$=2, a second-layer standard area Wb1 including the second-layer standard point Sb1 as a standard is set in the first converted standard image Gb1. If $N_h$=1, a first-layer standard area Wa1 including the first-layer standard point Sa1 as a standard is set in the standard image Ga1.

In Step St82, the $N_h$-th-layer reference area is set based on the $N_h$-th-layer search standard point determined in Step St7. For example, if $N_h$=4, a fourth-layer reference area Wd2 including the fourth-layer search standard point Sd2 as a standard in the third converted reference image Gd2. If $N_h$=3, a third-layer reference area Wc2 including the third-layer search standard point Sc2 as a standard is set in the second converted reference image Gc2. If $N_h$=2, a second-layer reference area Wb2 including the second-layer search standard point Sb2 as a standard is set in the first converted reference image Gb2. If $N_h$=1, a first-layer reference area Wa2 including the first-layer search standard point Sa2 as a standard is set in the reference image Ga2.

In Step St83, whether the numeric value $N_h$ is four is judged. The flow proceeds to Step St84 if the numeric value $N_h$ is four or proceeds to Step St86 if the numeric value $N_h$ is not four.

In Step St84, two-dimensional Fourier transforms are performed on the fourth-layer standard area image and fourth-layer reference area image. As a result, the fourth-layer standard frequency information and the fourth-layer reference frequency information are obtained.

In Step St85, the computed information storage section 366 stores the fourth-layer computed information.

In Step St86, an ($N_h$+1)th-layer computed information stored in the computed information storage section 366 is reused as part of the information for $N_h$-th-layer computation.

In Step St87, the other of the information for $N_h$-th-layer computation is computed through a partial two-dimensional Fourier transform for the $N_h$-th-layer standard area image and $N_h$-th-layer reference area image. As a result, the $N_h$-th-layer standard frequency information and $N_h$-th-layer reference frequency information are obtained.

In Step St88, the computed information storage section 366 stores the $N_h$-th-layer computed information.

In Step St89, normalization for removing the image amplitude components is performed on the $N_h$-th-layer standard frequency information and $N_h$-th-layer reference frequency information obtained in Step St84 or St87. As a result, the $N_h$-th-layer standard phase information and $N_h$-th-layer reference phase information are obtained.

In Step St90, a composition is performed on the $N_h$-th-layer standard phase information and $N_h$-th-layer reference phase information obtained in Step St89. As a result, an $N_h$-th-layer phase difference of each spatial frequency is calculated.

In Step St91, a two-dimensional inverse Fourier transform for the $N_h$-th-layer phase difference of each spatial frequency, which has been obtained in Step St90, is performed. As a result, a correlation computation of images included in the $N_h$-th-layer image group $N_h Hy$ is performed, so that the results (POC value) thereof are output.

In Step St92, a position of a peak of the POC value obtained in Step St91 is detected. This detects the position of the $N_h$-th-layer corresponding point. For example, the position of the fourth-layer corresponding point Cd2 is detected if $N_h=4$, the position of the third-layer corresponding point Cc2 is detected if $N_h=3$, the position of the second-layer corresponding point Cb2 is detected if $N_h=2$, and the position of the first-layer corresponding point Ca2 is detected if $N_h=1$. After the detection, the flow returns to Step St8 of FIG. 23 and then proceeds to Step St9.

Next, in Step St9 of FIG. 23, the corresponding point search section 363 judges whether the numeric value $N_h$ is one. The flow proceeds to Step St10 if the numeric value $N_h$ is not one or proceeds to Step St11 if the numeric value $N_h$ is one.

In Step St10, the corresponding point search section 363 reduces the numeric value $N_h$ by only one and then proceeds to Step St6.

In Step St11, the corresponding point search section 363 judges whether an image (also referred to as a processing target pixel) to be subjected to the corresponding point search process is left in the standard image Ga1. If a processing target pixel is left, the flow returns to Step St4. Then, the processes of Steps St4 to St11 are repeated until no processing target pixel is left. In contrast, if no processing target pixel is left, the operational flow is ended.

(8) Summary of Embodiment

As descried above, the image processing apparatus 3 according to the embodiment reuses, in the computation of the corresponding point search process between images of an image group having a relatively high level of resolution, the information on the frequency components obtained through the computation in the corresponding point search process between images of an image group having a relatively low level of resolution. This may reduce a computation amount in the corresponding point search process. As a result, the speed of searching for a corresponding point may be increased irrespective of the condition of an image to be used in the corresponding point search process. For example, the speed of searching of a corresponding point may be increased through a uniform computation, whereby the part that performs the corresponding point search process may be implemented as hardware such as a dedicated electronic circuit. Then, the search speed may be increased in the highly accurate corresponding point search process using POC computation method.

(9) Variations

The present invention is not limited to the above-mentioned embodiment, and various changes and variations can be made without departing from the scope of the present invention.

<(9-1) First Variation>

The second-layer computed information to fourth-layer computed information include at least part of the second-layer standard frequency information to fourth-layer standard frequency information and second-layer reference frequency information to fourth-layer reference frequency information in the embodiment described above, which is merely illustrative and not restrictive. For example, the second-layer computed information to fourth-layer computed information may include at least part of the second-layer standard phase information to fourth-layer standard phase information and second-layer reference phase information to fourth-layer reference phase information obtained through the normalization.

In this case, for example, the fourth-layer standard phase information and fourth-layer reference phase information as the fourth computed information stored in the computed information storage section 366 in the fourth-layer search process may be reused in the third-layer search process. In a case where the fourth-layer standard phase information is obtained from the fourth-layer computed information and used in the computation, it suffices that the information, which is obtained by correcting the fourth-layer standard phase information by a phase deviation amount corresponding to a reduction in level of resolution, is used in the computation. In a case where the fourth-layer reference phase information is obtained from the fourth-layer computed information and used in the computation, it suffices that the information, which is obtained by correcting the fourth-layer reference phase information by a phase deviation amount corresponding to a reduction in level of resolution, is used in the computation. Here, if the third-layer spatial frequency is $(u_3, v_3)$, a phase deviation amount is $(u_3 \times \pi, v_3 \times \pi)$.

The third-layer standard phase information and third-layer reference phase information as the third computed information stored in the computed information storage section 366 in the third-layer search process may be reused in the second-layer search process. In a case where the third-layer standard phase information is obtained from the third-layer computed information and is used in the computation, it suffices that the information, which is obtained by correcting the third-layer standard phase information by a phase deviation amount corresponding to a reduction in level of resolution, is used in the computation. In a case where the third-layer reference phase information is obtained from the third-layer computed information and is used in the computation, it suffices that the information, which is obtained by correcting the third-layer reference phase information by a phase deviation amount corresponding to a reduction in level of resolution, is used in the computation. Here, if the second-layer spatial frequency is $(u_2, v_2)$, a phase deviation amount is $(u_2 \times \pi, v_2 \times \pi)$.

The second-layer standard phase information and second-layer reference phase information as the second computed information stored in the computed information storage section 366 in the second-layer search process may be reused in the first-layer search process. In a case where the second-layer standard phase information is obtained from the second-layer computed information and is used in the computation, it suffices that the information, which is obtained by correcting the second-layer standard phase information by a phase deviation amount corresponding to a reduction in level of resolution, is used in the computation. In a case where the second-layer reference phase information is obtained from the second-layer computed information and is used in the computation, it suffices that the information, which is obtained by correcting the second-layer reference phase information by a phase deviation amount corresponding to a reduction in level of resolution, is used in the computation. Here, if the first-layer spatial frequency is $(u_1, v_1)$, a phase deviation amount is $(u_1 \times \pi, v_1 \times \pi)$.

The employment of this configuration may allow for omitting part of the two-dimensional Fourier transform and normalization in the third-layer search process, second-layer search process, and first-layer search process. This may further increase the speed of searching for a corresponding point by further reducing a computation amount. Also, a reduction in information amount of the information to be reused may reduce the storage capacity of the computed information storage section 366. This can result in reductions in the size and manufacturing cost of the image processing apparatus 3.

<(9-2) Second Variation>

For example, the second-layer computed information to fourth-layer computed information may include the information indicative of the second- to fourth-layer phase differences for each spatial frequency obtained through the composition.

In this case, for example, the information indicative of a fourth-layer phase difference for each spatial frequency as the fourth computed information stored in the computed information storage section 366 in the fourth-layer search process may be reused in the third-layer search process. The information indicative of a third-layer phase difference for each spatial frequency as the third computed information stored in the computed information storage section 366 in the third-layer search process may be reused in the second-layer search process. The information indicative of a second-layer phase difference for each spatial frequency as the second computed information stored in the computed information storage section 366 in the second-layer search process may be reused in the first-layer search process. In the reuse of a phase difference, reuse may be performed after multiplying a phase difference by a predetermined conversion factor.

The employment of this configuration may allow for omitting part of the two-dimensional Fourier transform and normalization in the third-layer search process, second-layer search process, and first-layer search process. This may further increase the speed of searching for a corresponding point by further reducing a computation amount. Also, a reduction in information amount of the information to be reused may reduce the storage capacity of the computed information storage section 366. This can result in reductions in the size and manufacturing cost of the image processing apparatus 3.

<(9-3) Third Variation>

The corresponding point search section 363 according to the embodiment described above performs a correlation computation using POC computation method in the corresponding point search process, which is merely illustrative and not restrictive. For example, a phase-difference spectrum analysis (PSA) method may be employed as the method of the correlation computation by the corresponding point search section 363.

Description is mainly given below with respect to the correlation computation using the PSA method that is different from the correlation computation using POC computation method according to the embodiment above. The first- to fourth-layer search processes may employ methods similar to each other, and thus, description is given with respect to the fourth-layer search process as an example.

As in the embodiment above, here, the Fourier transforms C11 and C21 and normalizations C12 and C22 are performed on the fourth-layer standard area image and fourth-layer reference area image in order, and further, a composition C3 is performed thereon. As a result, a fourth-layer phase difference $\Delta\theta(u, v)$ for each spatial frequency (u, v) is obtained. In other words, for each spatial frequency (u, v), the phase difference $\Delta\theta(u, v)$ is obtained based on the fourth-layer standard phase information and fourth-layer reference phase information.

Here, dx and dy denote deviation amounts (parallaxes) in the X direction and Y direction between the position of the standard point Sd1 in the fourth-layer standard area Wd1 and the position of the corresponding point Cd2 in the fourth-layer reference area Wd2. The relationship of Expression (8) below is held assuming that $N_1$ and $N_2$ denote the numbers of pixels in the X direction and Y direction that form the rectangular standard area Wd1 and reference area Wd2 to be subjected to a correlation computation, respectively.

$$dy = -(N_2/N_1) \times (u/v) \times dx + (N_2/2\pi) \times \Delta\theta(u,v)/v \quad (8)$$

The values $N_1$ and $N_2$ indicating the sizes of the standard area and reference area in Expression (8) are determined depending on design. Thus, a linear function (also referred to as a parallax linear function) showing a relationship between the parallax dx and parallax dy for each spatial frequency (u, v) is obtained by assigning the values $N_1$ and $N_2$ being design values to Expression (8) and assigning a phase difference $\Delta\theta(u, v)$ per spatial frequency (u, v) to Expression (8).

Thus, in the correlation computation using the PSA method, a maximum value of correlation values (also referred to as a maximum correlation value) $C_{max}$ between the fourth-layer standard area Wd1 and fourth-layer reference area Wd2 is obtained by performing Steps (I) and (II) below in this order.

(I) The phase difference $\Delta\theta(u, v)$ is converted into a parallax (dx, dy) for the fourth-layer standard point Sd1 and fourth-layer corresponding point Cd2 per spatial frequency (u, v) in accordance with Expression (8) above, so that a parallax linear function is obtained.

(II) Based on the parallax linear function of each spatial frequency (u, v) obtained in Step (I), voting is performed for each of the coordinates in a space (also referred to as a voting space) having a predetermined size with the parallax dx and parallax dy being horizontal and vertical axes, respectively. This obtains the distribution of integrated values of the numbers of voting for each coordinate in the voting space. In this case, the maximum value of the integrated values of the numbers of voting is obtained as the maximum correlation value $C_{max}$.

Here, the method of voting for coordinates in a voting space is described.

Figure 25:
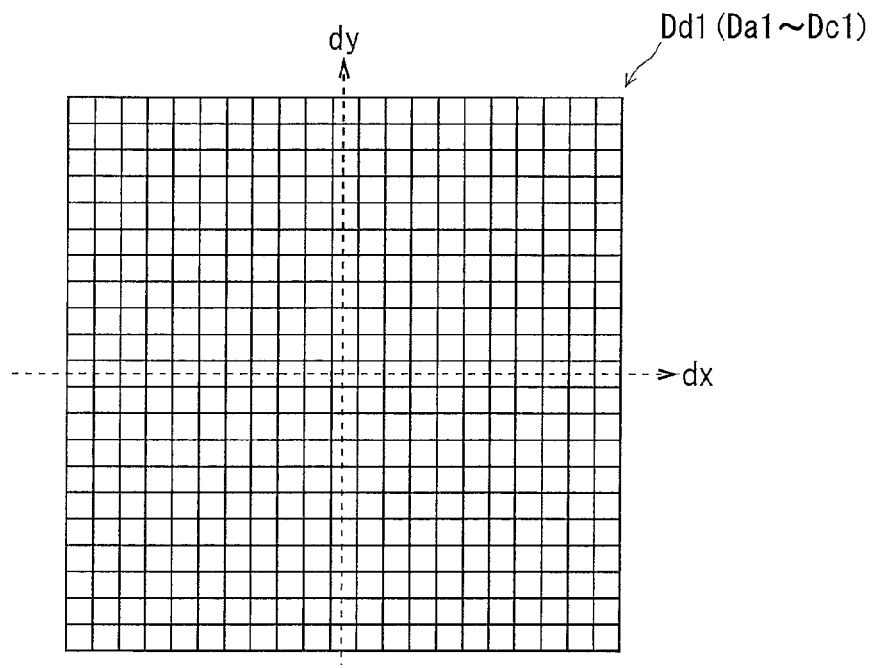
FIG. 25 is a diagram for describing a process of searching for a corresponding point in accordance with the PSA method.

FIG. 25 is a schematic diagram illustrating a voting space Dd1.

As shown in FIG. 25, the voting space Dd1 is formed as a two-dimensional spatial coordinate system in which the vertical and horizontal axes are perpendicular to each other, where the horizontal and vertical axes represent the parallax dx and parallax dy, respectively. The size of the voting space Dd1 may be determined in accordance with the number of spatial frequencies (u, v) to be handled and the dimension of the area where a corresponding point is searched for.

For example, in a case where a parallax (dx, dy) is searched for in increments of 0.1 pixels within the range of ±1 pixel, points (also referred to as voting allowed coordinate points) of the coordinates, where voting is allowed in increments of 0.1 pixels including an origin (0,0), are set in the voting space Dd1. For example, as shown in FIG. 25, 21 voting allowed coordinate points in the vertical direction being the dy direction and 21 voting allowed coordinate points in the horizontal direction being the dx direction are provided in matrix. FIG. 25 schematically shows each voting allowed coordinate point as a square area.

Figure 26:
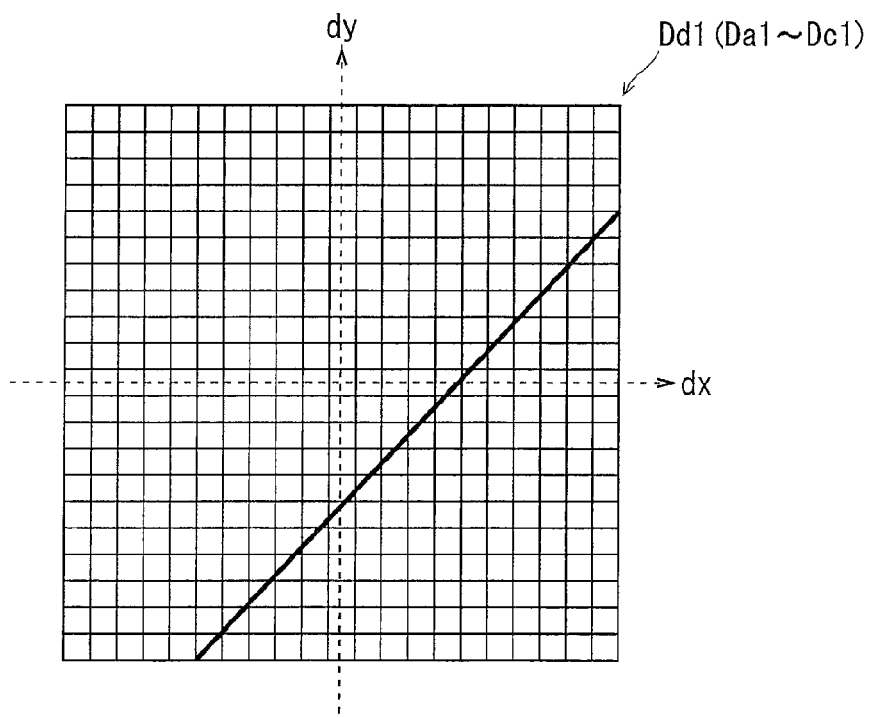
FIG. 26 is another diagram for describing the process of searching for a corresponding point in accordance with the PSA method.
Figure 27:
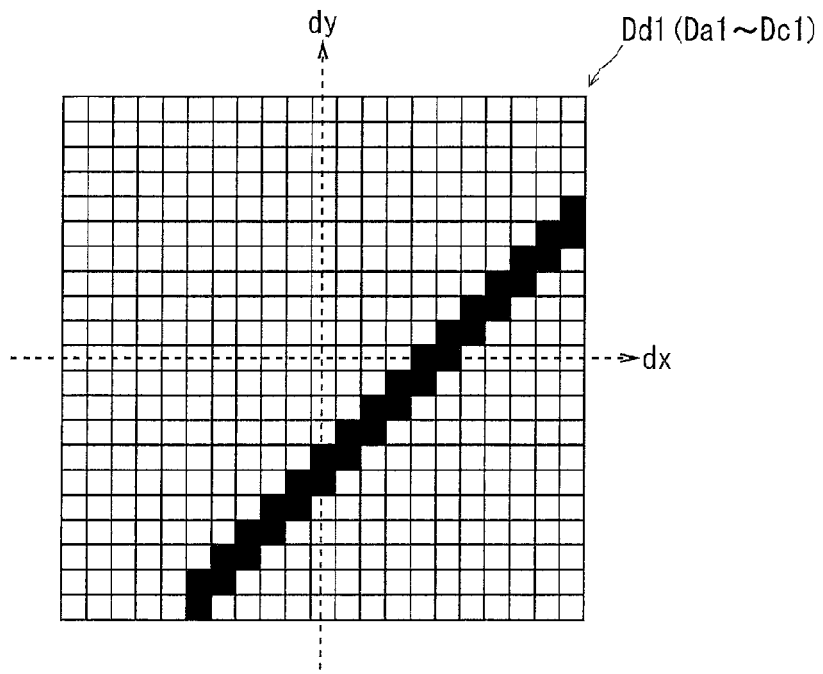
FIG. 27 is still another diagram for describing the process of searching for a corresponding point in accordance with the PSA method.

FIGS. 26 and 27 are diagrams for describing the voting method to the voting space Dd1.

As shown in FIG. 26, a straight line (thick line in the figure) represented by a parallax linear function is drawn in the voting space Dd1 for each spatial frequency (u, v). Then, for each spatial frequency (u, v), voting values are provided to all voting allowed coordinate points, through which the straight line regarding the parallax linear function passes, among a number of voting allowed coordinate points that form the voting space Dd1. For example, for the straight line regarding the parallax linear function shown in FIG. 26, voting values are provided to a plurality of voting allowed coordinate points as shown in FIG. 27.

For each spatial frequency (u, v), a voting value corresponding to an amplitude magnitude may be provided in a case where a voting value is provided to the voting allowed coordinate point. For example, the voting value may increase in accordance with an increase in amplitude. Specifically, the voting value may increase as amplitude components for each spatial frequency (u, v) increase. Alternatively, one or more thresholds may be provided to an amplitude such that a voting value increases in steps, such as 1, 2, 3, . . . , every time an amplitude increases and then exceeds the threshold.

The provision of voting values as described above obtains the distribution of integrated values of voting values (also referred to as voting integrated values) in the voting space Dd1. In this manner, a phase difference for each spatial frequency (u, v) is converted into a spatial deviation amount and the spatial deviation amount is voted to the voting space Dd1, so that the distribution of voting integrated values in the voting space Dd1, which are voting results, are obtained.

The distribution of voting integrated values obtained here shows a correlation between the fourth-layer third converted standard image Gd1 and fourth-layer third converted reference image Gd2, and a maximum value of the voting integrated values is the maximum correlation value $C_{max}$. Here, the voting integrated values near the point where the straight line of the parallax linear function intersects frequently can serve as the maximum correlation value $C_{max}$.

Then, a parallax (dx, dy) corresponding to the voting allowed coordinate point provided with the maximum correlation value $C_{max}$ is detected in the voting space Dd1. As a result, a fourth-layer corresponding point Cd2 corresponding to a fourth-layer standard point Sd1 is detected in the third converted reference image Gd2 based on the parallax (dx, dy) between the fourth-layer standard area Wd1 and fourth-layer reference area Wd2. In other words, in the fourth-layer search process, the fourth-layer corresponding point Cd2 is searched for based on the distribution of voting integrated values in the voting space Dd1.

The third-layer search process, second-layer search process, and first-layer search process are performed in order by method similar to the method for the fourth-layer search process, so that a first-layer corresponding point Ca2 corresponding to a first-layer standard point Sa1 is detected in the reference image Ga2.

For example, in the third-layer search process, a phase difference Δθ (u, v) is obtained for each spatial frequency (u, v) based on the third-layer standard phase information and the third-layer reference phase information, and the phase difference AO (u, v) is converted into a spatial deviation amount per spatial frequency (u, v). Then, the spatial deviation amount is voted to the voting space Dc1, obtaining the distribution of voting integrated values in the voting space Dc1 as the voting results. Then, the third-layer corresponding point Cc2 is searched for based on the distribution of the voting integrated values.

In the second-layer search process, a phase difference Δθ (u, v) is obtained for each spatial frequency (u, v) based on the second-layer standard phase information and the second-layer reference phase information, and the phase difference Δθ (u, v) is converted into a spatial deviation amount per spatial frequency (u, v). Then, the spatial deviation amount is voted to the voting space Db1, obtaining the distribution of voting integrated values in the voting space Db1. Then, the second-layer corresponding point Cb2 is searched for based on the distribution of the voting integrated values.

In the first-layer search process, a phase difference Δθ (u, v) is obtained for each spatial frequency (u, v) based on the first-layer standard phase information and the first-layer reference phase information, and the phase difference Δθ (u, v) is converted into a spatial deviation amount per spatial frequency (u, v). Then, the spatial deviation amount is voted to the voting space Da1, obtaining the distribution of voting integrated values in the voting space Da1 as the voting results. Then, the first-layer corresponding point Ca2 is searched for based on the distribution of the voting integrated values.

Also in the employment of a correlation computation using the PSA method, the fourth-layer computed information may be stored in the computed information storage section 366 in the fourth-layer search process to be reused in the third-layer search process, as in the embodiment described above. The third-layer computed information may be stored in the computed information storage section 366 in the third-layer search process to be reused in the second-layer search process. The second-layer computed information may be stored in the computed information storage section 366 in the second-layer search process to be reused in the first-layer search process.

The second-layer computed information to fourth-layer computed information reused here may include at least part of the second standard frequency information to fourth standard frequency information and the second reference frequency information to fourth reference frequency information, as in the embodiment above.

Alternatively, as in the first variation above, the second-layer computed information to fourth-layer computed information to be reused may include at least part of the second-layer standard frequency information to fourth-layer standard frequency information and the second-layer reference phase information to fourth-layer reference phase information obtained through the normalization. Still alternatively, in such a manner that voting values in the voting spaces Da1 to Dd1 are changed in accordance with amplitude components, the second-layer computed information to fourth-layer computed information to be reused may include at least part of the second-layer amplitude information to fourth-layer amplitude information.

As described above, the computation results of the two-dimensional Fourier transforms in the second to fourth-layer search processes may be output in the form of a complex number having a real part Re (u, v) and an imaginary part Im (u, v). Amplitude information A (u, v) obtained through the two-dimensional Fourier transform is obtained from the real part Re (u, v) and the imaginary part Im (u, v), as expressed by Math 6.

$$A(u,v)=\sqrt{Re(u,v)^2+Im(u,v)^2} \quad \text{[Math 6]}$$

The second-layer standard phase information θ (u, v) to fourth-layer standard phase information θ (u, v) and the second-layer reference phase information θ (u, v) to fourth-layer reference phase information θ (u, v) can be obtained from a real part Re (u, v) and an imaginary part Im (u, v) as expressed by Math 7.

$$\theta(u, v) = \tan^{-1}\left\{\frac{Re(u, v)}{Im(u, v)}\right\} \quad \text{[Math 7]}$$

From the above, the second-layer computed information to fourth-layer computed information may be stored in the form of amplitude information and phase information or in the form of a real part Re (u, v) and an imaginary part Im (u, v).

As in the second variation above, the second-layer computed information to fourth-layer computed information may include the information indicative of second- to fourth-layer phase differences Δθ (u, v) for each spatial frequency obtained through the composition.

Further, the fourth-layer computed information may include the information indicative of results obtained by converting a phase difference Δθ (u, v), which is calculated based on the fourth-layer standard phase information and fourth-layer reference phase information, into a spatial deviation amount for one or more spatial frequencies (u, v) and then voting the spatial deviation amount to the voting space Dd1.

For example, if a predetermined conversion factor is 1/n, the relationship of Expression (9) below may be held between the fourth-layer spatial frequency ($u_4$, $v_4$) and the third-layer spatial frequency ($u_3$, $v_3$) for the search windows having the same size.

$$u_3=u_4/n, v_3=v_4/n \quad (9)$$

For example, if a predetermined conversion factor 1/n is ½, the information of the AC components in cases where the fourth-layer spatial frequency ($u_4$, $v_4$) is (2, 2), (4, 4), (6, 6), (8, 8), (10, 10), (12, 12), (14, 14), and (16, 16) is similar to the information of the AC components in cases where the third-layer spatial frequency ($u_3$, $v_3$) is (1, 1), (2, 2), (3, 3), (4, 4), (5, 5), (6, 6), (7, 7), and (8, 8), respectively. In other words, the information of the AC components in a case where the frequencies of the fourth-layer spatial frequency ($u_4$, $v_4$) are both even numbers is similar to the information of the AC components of the third layer for the spatial frequency ($u_3$, $v_3$) which is a half of the spatial frequency ($u_4$, $v_4$).

For example, in the fourth-layer search process, first, the standard phase information and reference phase information for the even-numbered fourth layer spatial frequency ($u_4$, $v_4$) are converted into the standard phase information and reference phase information of the spatial frequency ($u_3$, $v_3$) being ½ of the spatial frequency ($u_4$, $v_4$). Then, the standard phase information and reference phase information are corrected by the deviation amount ($u_3 \times \pi$, $v_3 \times \pi$). Then, a phase difference Δθ (u, v) calculated based on the corrected standard phase information and reference phase information is converted into a spatial deviation amount, and then, the spatial deviation amount is voted to the voting space Dd1. Then, the information indicative of the voting results may serve as the fourth-layer computed information.

The third-layer computed information may include the information indicative of the results obtained by converting a phase difference Δθ (u, v), which is calculated based on the third-layer standard phase information and third-layer reference phase information for one or more spatial frequencies (u, v), into a spatial deviation amount and then voting the spatial deviation amount to the voting space Dc1. Further, the second-layer computed information may include the information indicative of the results obtained by converting a phase difference Δθ (u, v), which is calculated based on the second-layer standard phase information and second-layer reference phase information for one or more spatial frequencies (u, v), into a spatial deviation amount and then voting the spatial deviation amount to the voting space Db1.

In other words, the search process on each layer among the first to third layers may reuse the information indicative of the voting results on the voting spaces Dd1 to Db1 for one or more spatial frequencies (u, v) obtained in the search process on the last layer. In this case, the third-layer computed information and second-layer computed information may be calculated by a method similar to that for the fourth-layer computed information. The employment of the above-mentioned configuration may reduce the storage capacity of the computed information storage section 366 through a reduction in amount of the information to be reused. This can result in reductions in the size and manufacturing cost of the image processing apparatus 3.

<(9-4) Fourth Variation>

In the embodiment above, the fourth-layer reference phase information is corrected by a deviation amount ($u_3 \times \pi$, $v_3 \times \pi$) of a phase corresponding to a reduction in level of resolution in a case where the fourth-layer reference phase information is obtained from the fourth-layer computed information and used in the third-layer search process, which is merely illustrative and not restrictive.

Figure 28:
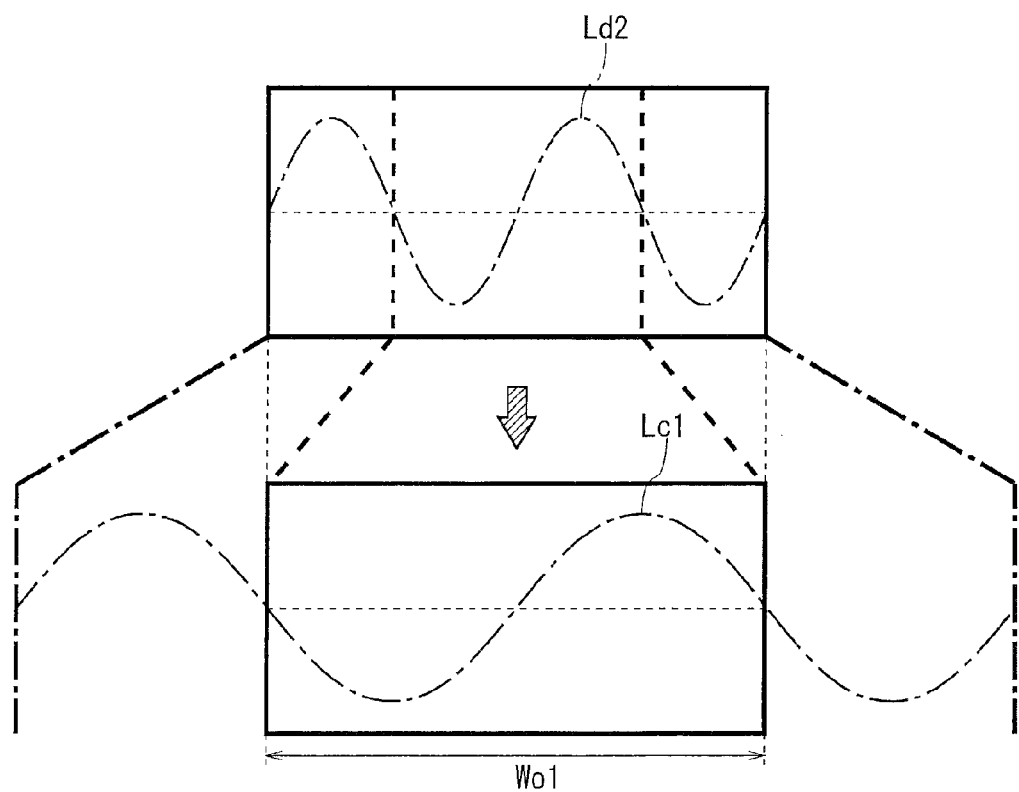
FIG. 28 is a diagram for describing a method of correcting a phase deviation on the reference image side.

As shown in FIG. 28, for example, the third-layer search standard point Sc2 is set at a position corresponding to the fourth-layer search standard point Sd2 in a case where the search standard point Sd2 coincides with the corresponding point Cd2 in the fourth-layer search process. In this case, in reuse of the information of the AC component having the fourth-layer frequency $u_4$ as the information of the AC component having the frequency $u_3$ being ½ of the frequency $u_4$, the phase $u_4\theta$ of the AC component having the fourth-layer frequency $u_4$ may be corrected by the deviation amount $u_3 \times \pi$, as described above.

Figure 29:
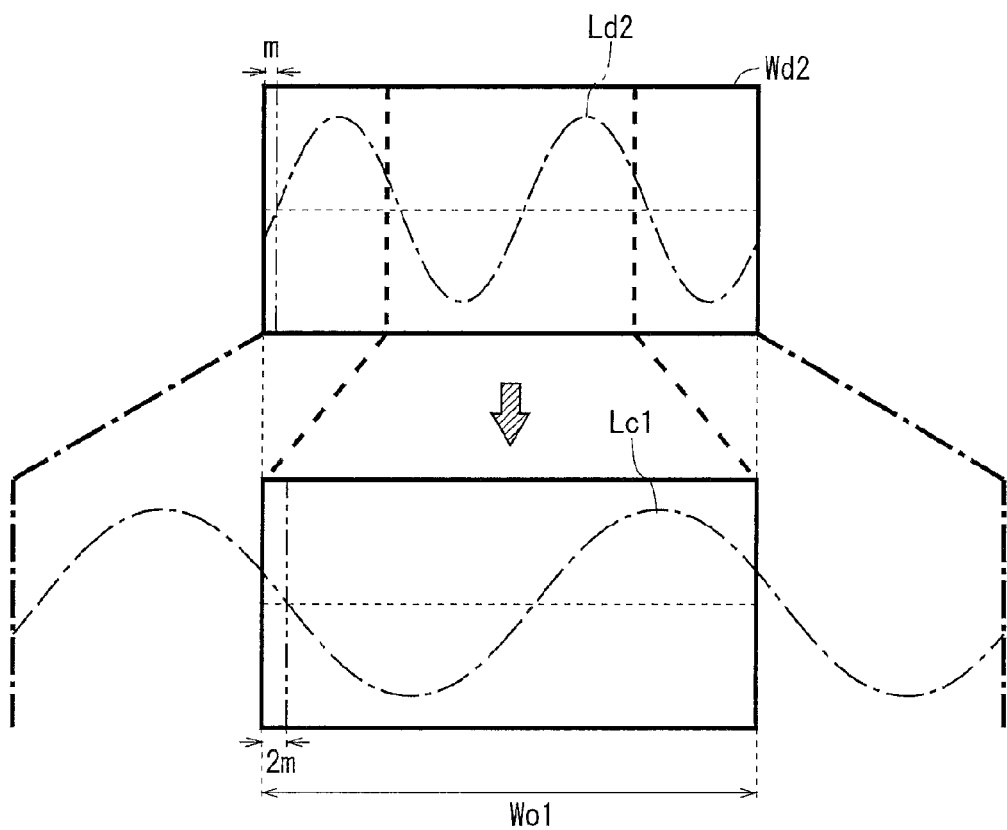
FIG. 29 is another diagram for describing a method of correcting a phase deviation on the reference image side.

Meanwhile, as shown in FIG. 29, for example, in a case where the search standard point Sd2 and the corresponding point Cd2 are deviated from each other in the X direction by m pixels (m is a natural number) in the fourth-layer search process, in the third-layer search process, the search standard point Sc2 is set at the position deviated from the pixel corresponding to the search standard point Sd2 in the X direction by 2m pixels.

In this case, if the number of pixels in the X direction of the search window is 33, the phase of the AC component having the frequency $u_3$ is deviated by $2m \times u_3 \times 2\pi/33$ between the AC component having the frequency $u_4$ of the fourth-layer reference area image and the AC component having the frequency $u_3$ being ½ of the frequency $u_4$, of the third-layer reference area image. Here, the frequency 1 is equivalent to $2\pi$.

For example, in reuse of the information of the AC component having the fourth-layer frequency $u_4$ as the information of the AC component having the frequency $u_3$ being ½ of the frequency $u_4$, the phase $u_4\theta$ of the AC component having the fourth-layer frequency $u_4$ may be corrected by the deviation amount $u_3 \times \pi$ and the deviation amount $2m \times u_3 \times 2\pi/33$.

Thus, in this case, the phase $u_3\theta$ of the AC component having the third-layer frequency $u_3$ may be $2 \times u_4 \theta - u_3 \times \pi - 2m \times u_3 \times 2\pi/33$.

In other words, in a case where the fourth-layer reference phase information is obtained from the fourth-layer computed information and is then used in the computation, it is preferable that in the third-layer search process, a phase deviation of the fourth-layer reference phase information be corrected in accordance with the spatial deviation amount $2m \times u_3 \times 2\pi/33$ between the search standard point Sd2 and corresponding point Cd2 and be then used in computation. Similar corrections are preferably performed in the second-layer search process and first-layer search process.

As a result, the accuracy of the corresponding point search in the search process may be improved. Also in a case where a phase is deviated as described above, the deviation can be handled through a uniform computation, thereby implementing a part that performs the corresponding point search process as hardware such as a dedicated electronic circuit.

<(9-5) Fifth Variation>

The weighting coefficient Wt (u, v) expressed by Math 4 above is set to one irrespective of the spatial frequency (u, v) in the embodiment above, which is merely illustrative and not restrictive. For example, in reuse of the information on one or more spatial frequencies (u, v) from the computed information in the first to third-layer search processes, the weighting coefficient Wt (u, v) for one or more spatial frequencies (u, v) may be set to a predetermined value less than one. The predetermined value may be set to, for example, 1/n being a numeric value corresponding to the predetermined conversion factor. In other words, it suffices that the weighting coefficient Wt (u, v) for one or more spatial frequencies (u, v) regarding reuse is relatively smaller than the weighting coefficient Wt (u, v) for the other of the one or more spatial frequencies (u, v). Further, in other words, the information may be weighted in the first- to third-layer search processes such that part of the computed information less affects the results of the corresponding point search than the other of the information. This can result in an improvement in accuracy of the corresponding point search.

In this case, for example, the information is weighted in the third-layer search process such that part of the information for the third-layer computation, which is obtained from the fourth-layer computed information, less affects the results of the search for the third corresponding point Cc2 than the other of the information for the third-layer computation. In the second-layer search process, for example, the information is weighted such that part of the information for the second-layer computation, which is obtained from the third-layer computed information, less affects the results of the search for the second corresponding point Cb2 than the other of the information for the second-layer computation. Further, in the first-layer search process, for example, the information is weighted such that part of the information for the first-layer computation, which is obtained from the second-layer computed information, less affects the results of the search for a first corresponding point Ca2 than the other of the information for the first-layer computation.

For example, in a case where a predetermined conversion factor is ½, the frequency component having a frequency of four on the fourth layer may be reused for the frequency component having a frequency of two in the third-layer search process, and may be reused for the frequency component having a frequency of one in the second-layer search process. Of the computed information, as to the information to be reused twice or more, the weighting coefficient Wt (u, v) may be reduced sequentially in accordance with, for example, the number of times of reuse as described above. Specifically, there is a conceivable manner in which the weighting coefficient Wt (u, v) is 0.8 in the first reuse, the weighting coefficient Wt (u, v) is 0.6 in the second reuse, and the weighting coefficient Wt (u, v) is 0.4 in the third reuse.

In the search process on a certain layer, as certain information is reused a larger number of times, the ratio of that information to the information to be used in the search process computation decreases. This also results in a reduction of an influence of the information, which is reused a large number of times, on the search process computation. As a result, the search accuracy is assured while speeding up the search process.

For example, in a case where the PSA method is employed in the first- to fourth-layer search processes and the information on one or more spatial frequencies (u, v) is reused in the first- to third-layer search processes, a voting value for the one or more spatial frequencies (u, v) may be made smaller than a value corresponding to an amplitude. In other words, a voting value may be made smaller than a value corresponding to an amplitude in a case where a voting value is provided to the voting spaces Da1 to Dc1 in accordance with a parallax linear function derived through reuse of the information on one or more spatial frequencies (u, v). Through the above, the information is weighted such that in the first- to third-layer search processes, part of the information for computation obtained from the computed information less affects the results of the corresponding point search than the other of the information.

<(9-6) Other Variations>

The embodiment and first to fifth variations above employ POC computation method and PSA method as the method of obtaining the frequency information of an image pattern in a search window and performing the corresponding point search process based on the phase information of each frequency component, which is merely illustrative and not restrictive. For example, other computations such as the discrete cosine transform sign correlation (DSC) computation are adoptable in the corresponding point search process. The DCT sign correlation computation performs the POC computation of an image obtained by mirror image extension using positive and negative signs of a discrete cosine transform factor of an image. In other words, the DCT sign correlation is equivalent to the phase-only correlation for a signal of an extended target.

The embodiment and first to fifth variations above reuse the information obtained from an image having a relatively low level of resolution in the computation targeted for an image having a relatively high level of resolution, which is merely illustrative and not restrictive. For example, the information obtained from an image having a relatively high level of resolution may be reused in the computation targeted for an image having a relatively low level of resolution.

Specifically, in the first- to fourth-layer search processes, first, the positions of the first- to fourth-layer standard areas Wa1 to Wd1 can be determined uniquely at a time when the first to fourth standard points Sa1 to Sd1 are set. Thus, there is a conceivable manner in which the frequency information is obtained for a first-layer standard area image, and then, by using the frequency information, the frequency information for the second- to fourth-layer standard area images are obtained.

To be more specific, for example, at least part of the information regarding the first-layer standard frequency information obtained in the computation of the first-layer search process may be stored in the computed information storage section 366 as computed information, and be then used as part of the information for computation of the second-layer standard frequency information. In this case, the other of the information for computation of the second-layer reference frequency information may be calculated based on the first converted standard image Gb1. It suffices that the information to be reused here includes, for example, the phase information being part of the frequency information.

In this case, if a predetermined conversion factor is ½, for example, the AC component having the spatial frequency ($u_1$, $v_1$) for the first-layer standard area image is similar to the AC component having the spatial frequency ($u_2$, $v_2$) for the second-layer standard area image that satisfies such relationships that $u_1=2\times u_2$ and $v_1=2\times v_2$. For example, the information of the AC component, in which the first-layer spatial frequency ($u_1$, $v_1$) is (1, 1), (2, 2), (3, 3), (4, 4), (5, 5), (6, 6), (7, 7), and (8, 8), is similar to the information of the AC components in cases where the second-layer spatial frequency ($u_2$, $v_2$) is (2, 2), (4, 4), (6, 6), (8, 8), (10, 10), (12, 12), (14, 14), and (16, 16). Thus, in the second-layer search process, the standard phase information on the first-layer spatial frequency ($u_1$, $v_1$) can be reused after being converted into the standard phase information on the spatial frequency ($u_2$, $v_2$) that is twice as large as the spatial frequency ($u_1$, $v_1$) corresponding to a predetermined conversion factor of the second layer. In reuse of the information of the AC component having the first-layer frequency $u_1$ as the information on the AC component having the second-layer frequency $u_2$ twice as large as the frequency $u_1$, a phase $u_1\theta$ of the AC component having the first-layer frequency $u_1$ is preferably corrected by a deviation amount $u_2\times\pi$ corresponding to a reduction in level of resolution. The above-mentioned information reuse may reduce a computation amount, which is required for a Fourier transform targeted for a second-layer standard area image, to about $\{1-(1/2)^2\}$.

At least part of the information regarding the first-layer standard frequency information obtained by the computation of the first-layer search process may be stored in the computed information storage section 366 as the computed information, and may be used as part of the information for computations of the third-layer standard frequency information and fourth-layer standard frequency information. In this case, the other of the information for computations of the third-layer standard frequency information and fourth-layer standard frequency information may be calculated based on the second and third converted standard images Gc1 and Gd1. It should be note that, for example, in reuse of the information of the AC component having the first-layer frequency $u_1$ as the information of the AC components having the third- and fourth-layer frequencies $u_3$ and $u_4$, which are four times and eight times as large as the first-layer frequency $u_1$, the phase $u_1\theta$ of the AC component having the first-layer frequency $u_1$ is preferably corrected by deviation amounts $u_3\times\pi$ and $u_4\times\pi$ corresponding to a reduction in level of resolution.

At least part of the information regarding the second-layer standard frequency information obtained in the computation of the second-layer search process may be stored in the computed information storage section 366 as the computed information, and be then used as part of the information for computation of the third-layer standard frequency information and fourth-layer standard frequency information. In this case, the other of the information for computation of the third-layer standard frequency information and fourth-layer standard frequency information may be calculated based on the second and third converted standard images Gc1 and Gd1 It should be note that, for example, in reuse of the information of the AC component having the second-layer frequency $u_2$ as the information of the AC components having the third- and fourth-layer frequencies $u_3$ and $u_4$, which are twice and four times as large as the first-layer frequency $u_1$, the phase $u_2\theta$ of the AC components having the second-layer frequency $u_2$ is preferably corrected by deviation amounts $u_3\times\pi$ and $u_4\times\pi$ corresponding to a reduction in level of resolution.

At least part of the information regarding the third-layer standard frequency information obtained in the computation of the third-layer search process may be stored in the computed information storage section 366 as the computed information, and be then used as part of the information for computation of the fourth-layer standard frequency information. In this case, the other of the information for computation of the fourth-layer standard frequency information may be calculated based on the third converted standard image Gd1. It should be note that, for example, in reuse of the information of the AC component having the third-layer frequency $u_3$ as the information of the AC component having the fourth-layer frequency $u_4$, which is twice as large as the third-layer frequency $u_3$, the phase $u_3\theta$ of the AC component having the third-layer frequency $u_3$ is preferably corrected by a deviation amount $u_4\times\pi$ corresponding to a reduction in level of resolution.

The distance calculation section 367 calculates the distance from the first and second cameras 1 and 2 to the subject OB1 from the correspondence relationship of pixels between the standard image Ga1 and reference image Ga2 in the embodiment and first to fifth variations above, which is merely illustrative and not restrictive. For example, a three-dimensional position ($X_1, Y_1, Z_1$) of the subject OB1 may be calculated using three expressions $X_1=x_1\times D/f$, $Y_1=y_1\times D/f$, and $Z_1=D$. Here, $x_1$ and $y_1$ denote coordinates of a pixel of interest on the standard image Ga1.

Figure 30:
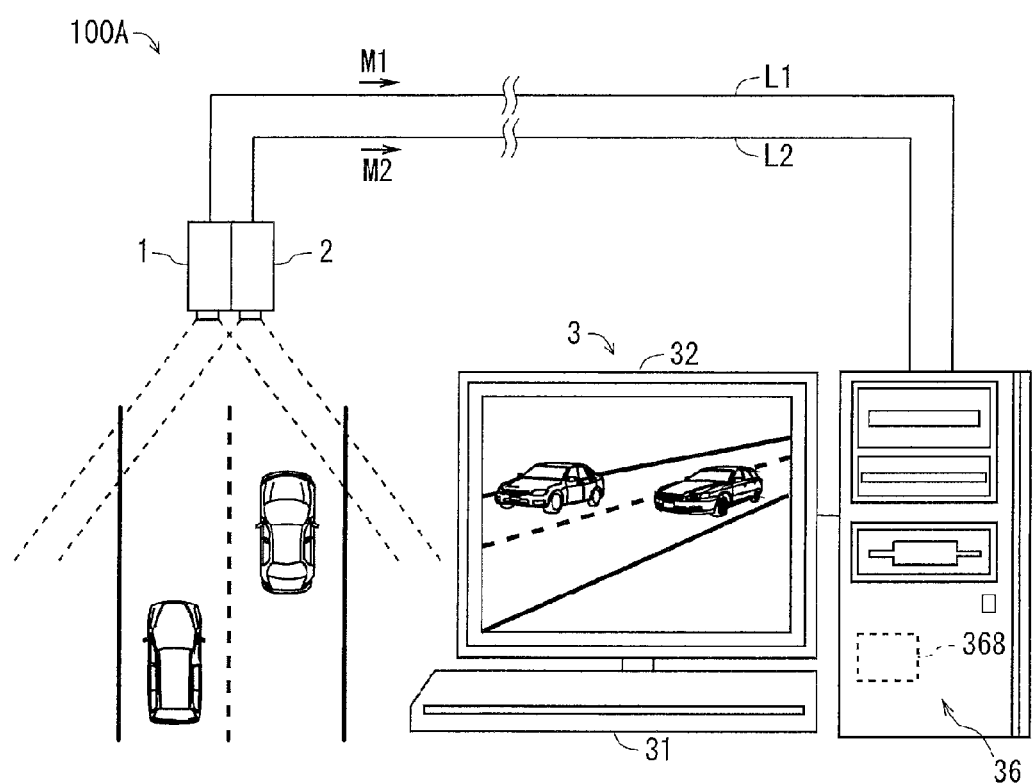
FIG. 30 is a diagram showing one exemplary application of the information processing system.

FIG. 30 illustrates a schematic configuration of an information processing system 100A obtained by additionally providing a three-dimensional position calculation section 368, which calculates a three-dimensional position ($X_1, Y_1, Z_1$) of the subject OB1, to the controller 36 of the information processing system 100. For example, the information processing system 100A may visibly output an image (also referred to as a three-dimensional image) three-dimensionally showing the subject OB1 on the display 32, based on the three-dimensional position ($X_1, Y_1, Z_1$) of the subject OB1.

The embodiment and first to fifth variations above search for a correlation relationship of pixels between two images taken at the same timing by the first and second cameras 1 and 2, which is merely illustrative and not restrictive. For example, one camera C1 may image a subject in a time sequential manner, the image processing apparatus 3 may obtain data of a plurality of pixels via a communication line Ln1 and search for a correspondence relationship of pixels between a plurality of images, so that a motion vector of the subject is calculated from the correspondence relationship between the pixels.

FIG. 31 illustrates a schematic configuration of an information processing system 100B obtained by additionally providing a motion information calculation section 369, which calculates a motion vector of a subject, to the controller 36 of the information processing system 100. In the information processing system 100B, the first and second cameras 1 and 2 of the information processing system 100 are replaced by the camera C1, and the communication lines L1 and L2 thereof are replaced by the communication line Ln1. In the information processing system 100B, for example, display elements such as an arrow indicating a motion vector of the subject may be visibly output on the display 32 together with an image capturing the subject, based on the motion vector of the subject.

Although the embodiment and first to fifth variations above perform the first- to fourth-layer search processes, it suffices that the search process is performed on two or more layers.

The embodiment and first to fifth variations above reuse the computed information in the search process on the last layer in the first- to third-layer search processes, which is merely illustrative and not restrictive. It suffices that for example, any one of the reuse in the third-layer search process for the computed information obtained in the fourth-layer search process, the reuse in the second-layer search process for the computed information obtained in the third-layer search process, and the reuse in the first-layer search process for the computed information obtained in the second-layer search process may be performed. In other words, it suffices that in one search process, the computed information obtained in the other search process is reused between the search processes on two or more layers.

The embodiment and first to fifth variations above reuse the computed information in the computations for both of the standard image Ga1 and reference image Ga2, which is merely illustrative and not restrictive. For example, it suffices that the computed information is reused in at least one of the computations for the standard image Ga1 side and the reference image Ga2 side.

It is apparent that all or partial portions constituting the embodiment and variations above can be combined as appropriate within a consistent range.

DESCRIPTION OF SYMBOLS 1 first camera
2 second camera
3 image processing apparatus
4 storage medium
34 storage
36 controller
36a CPU
36b memory
100, 100A, 100B information processing system
361 image acquisition section
362 image generation section
363 corresponding point search section
364 corresponding point search control section
365 position determination section
366 computed information storage section
367 distance calculation section
368 three-dimensional position calculation section
369 motion information calculation section
C1 camera
PG program

The invention claimed is:

1. An image processing apparatus, comprising:
an acquisition section that obtains a first image and a second image;
a generation section that, in accordance with a predetermined conversion factor, reduces a level of resolution of the first image to generate a first converted standard image and reduces a level of resolution of the second image to generate a first converted reference image;
a search section that performs:
a first search process of searching the first converted reference image for a first corresponding point that corresponds to a first standard point based on first phase information on each frequency component of first frequency information regarding a first standard area including the first standard point as a standard in the first converted standard image and based on second phase information on each frequency component of second frequency information regarding a first reference area including a first search standard point as a standard in the first converted reference image; and
a second search process of searching the second image for a second corresponding point that corresponds to a second standard point based on third phase information on each frequency component of third frequency information regarding a second standard area including the second standard point corresponding to the first standard point as a standard in the first image and based on fourth phase information on each frequency component of fourth frequency information regarding a second reference area including a second search standard point as a standard in the second image;
a determination section that determines a position of the second search standard point in the second image based on a position of the first corresponding point in the first converted reference image; and
a storage section that stores computed information regarding at least part of the first frequency information and the second frequency information obtained through the computation in the first search process and the third frequency information obtained through the computation in the second search process,
wherein the search section performs at least one of:
in the second search process, the process of using the computed information obtained through the computation in the first search process as part of information for computations regarding the third frequency information and the fourth frequency information to calculate the other of the information for computations regarding the third frequency information and the fourth frequency information based on the first and second images; and
in the first search process, the process of using the computed information obtained through the computation in the second search process as part of information for computation regarding the first frequency information to calculate the other of the information for computation regarding the first frequency information based on the first converted standard image.

2. An image processing apparatus, comprising:
an acquisition section that obtains a first image and a second image;
a generation section that, in accordance with a predetermined conversion factor, reduces a level of resolution of the first image to generate a first converted standard image and a second converted standard image having a lower level of resolution than that of the first converted standard image and reduces a level of resolution of the second image to generate a first converted reference image and a second converted reference image having a lower level of resolution than that of the first converted reference image;
a search section that performs:
a first search process of searching the second converted reference image for a first corresponding point that corresponds to a first standard point based on first phase information on each frequency component of first frequency information regarding a first standard area including the first standard point as a standard in the second converted standard image and based on second phase information on each frequency component of second frequency information regarding a first reference area including a first search standard point as a standard in the second converted reference image; and a second search process of searching the first converted reference image for a second corresponding point that corresponds to a second standard point corresponding to the first standard point based on third phase information on each frequency component of third frequency information regarding a second standard area including the second standard point as a standard in the first converted standard image and based on fourth phase information on each frequency component of fourth frequency information regarding a second reference area including a second search standard point as a standard in the first converted reference image;

a determination section that determines a position of the second search standard point in the first converted reference image based on a position of the first corresponding point in the second converted reference image; and a storage section that stores computed information regarding at least part of the first frequency information and the second frequency information obtained through the computation in the first search process and the third frequency information obtained through the computation in the second search process, wherein the search section performs at least one of:

in the second search process, the process of using the computed information obtained through the computation in the first search process as part of information for computations regarding the third frequency information and the fourth frequency information to calculate the other of the information for computations regarding the third frequency information and the fourth frequency information based on the first converted standard image and the first converted reference image; and in the first search process, the process of using the computed information obtained through the computation in the second search process as part of information for computation regarding the first frequency information to calculate the other of the information for computation regarding the first frequency information based on the second converted standard image.

3. The image processing apparatus according to claim 1, wherein the search section uses a phase-only correlation computation in the first and second search processes.

4. The image processing apparatus according to claim 1, wherein the computed information includes at least part of the first frequency information to the third frequency information.

5. The image processing apparatus according to claim 1, wherein the computed information includes at least part of the first phase information to the third phase information.

6. The image processing apparatus according to claim 1, wherein the computed information includes information indicative of a phase difference calculated based on the first phase information and the second phase information.

7. The image processing apparatus according to claim 1, wherein in the first search process, for each frequency component, the search section calculates a first phase difference based on the first phase information and the second phase information to convert the first phase difference into a first spatial deviation amount, and votes the first spatial deviation amount to a first voting space to obtain a first voting result, to thereby search for the first corresponding point in accordance with the first voting result, in the second search process, for each frequency component, the search section calculates a second phase difference based on the third phase information and the fourth phase information to convert the second phase difference into a second spatial deviation amount, and votes the second spatial deviation amount to a second voting space to obtain a second voting result, to thereby search for the second corresponding point in accordance with the second voting result, and the computed information includes information indicative of a voting result obtained by converting the first phase difference of one or more frequency components into a spatial deviation amount and then voting the spatial deviation amount to the first voting space in the first search process.

8. The image processing apparatus according to claim 1, wherein in the second search process, the search section corrects the first phase information by a deviation amount of a phase corresponding to a reduction in the level of resolution and uses the corrected first phase information in computation upon obtaining the first phase information from the computed information calculated in the first search process and using the first phase information in computation, and corrects the second phase information by a deviation amount of a phase corresponding to a reduction in the level of resolution and uses the corrected second phase information in computation upon obtaining the second phase information from the computed information calculated in the first search process and using the second phase information in computation, and in the first search process, the search section corrects the third phase information by a deviation amount of a phase corresponding to a reduction in the level of resolution and uses the corrected third phase information in computation upon obtaining the third phase information from the computed information calculated in the second search process and using the third phase information in computation.

9. The image processing apparatus according to claim 1, wherein the predetermined conversion factor is 1/n where n is any number larger than one, in the second search process, the search section uses the first frequency information regarding a first frequency as the third frequency information regarding a second frequency obtained by multiplying the first frequency by 1/n upon obtaining the first frequency information regarding the first frequency from the computed information calculated in the first search process and using the first frequency information in computation, and uses the second frequency information regarding the first frequency as the fourth frequency information regarding the second frequency upon obtaining the second frequency information regarding the first frequency from the computed information calculated in the first search process and using the second frequency information in computation, and in the first search process, the search section uses the third frequency information regarding the second frequency as the first frequency information regarding the first frequency obtained by multiplying the second frequency by n upon obtaining the third frequency information regarding the second frequency from the computed information calculated in the second search process and using the third frequency information in computation.

10. The image processing apparatus according to claim 1, wherein in the second search process, the search section corrects a deviation of a phase of the second phase information in accordance with a spatial deviation amount between the first search standard point and the first corresponding point and uses the corrected second phase information in computation upon obtaining the second phase information from the computed information calculated in the first search process and using the second phase information in computation.

11. The image processing apparatus according to claim 1, wherein in the second search process, the search section performs weighting of information such that the computed information used in computation as part of information for computations regarding the third frequency information and the fourth frequency information less affects the search results on the second corresponding point than the other of the information for computations.

12. The image processing apparatus according to claim 2, wherein the search section uses a phase-only correlation computation in the first and second search processes.

13. The image processing apparatus according to claim 2, wherein the computed information includes at least part of the first frequency information to the third frequency information.

14. The image processing apparatus according to claim 2, wherein the computed information includes at least part of the first phase information to the third phase information.

15. The image processing apparatus according to claim 2, wherein the computed information includes information indicative of a phase difference calculated based on the first phase information and the second phase information.

16. The image processing apparatus according to claim 2, wherein
- in the first search process, for each frequency component, the search section calculates a first phase difference based on the first phase information and the second phase information to convert the first phase difference into a first spatial deviation amount, and votes the first spatial deviation amount to a first voting space to obtain a first voting result, to thereby search for the first corresponding point in accordance with the first voting result,
- in the second search process, for each frequency component, the search section calculates a second phase difference based on the third phase information and the fourth phase information to convert the second phase difference into a second spatial deviation amount, and votes the second spatial deviation amount to a second voting space to obtain a second voting result, to thereby search for the second corresponding point in accordance with the second voting result, and
- the computed information includes information indicative of a voting result obtained by converting the first phase difference of one or more frequency components into a spatial deviation amount and then voting the spatial deviation amount to the first voting space in the first search process.

17. The image processing apparatus according to claim 2, wherein
- in the second search process, the search section corrects the first phase information by a deviation amount of a phase corresponding to a reduction in the level of resolution and uses the corrected first phase information in computation upon obtaining the first phase information from the computed information calculated in the first search process and using the first phase information in computation, and corrects the second phase information by a deviation amount of a phase corresponding to a reduction in the level of resolution and uses the corrected second phase information in computation upon obtaining the second phase information from the computed information calculated in the first search process and using the second phase information in computation, and
- in the first search process, the search section corrects the third phase information by a deviation amount of a phase corresponding to a reduction in the level of resolution and uses the corrected third phase information in computation upon obtaining the third phase information from the computed information calculated in the second search process and using the third phase information in computation.

18. The image processing apparatus according to claim 2, wherein
- the predetermined conversion factor is 1/n where n is any number larger than one,
- in the second search process, the search section uses the first frequency information regarding a first frequency as the third frequency information regarding a second frequency obtained by multiplying the first frequency by 1/n upon obtaining the first frequency information regarding the first frequency from the computed information calculated in the first search process and using the first frequency information in computation, and uses the second frequency information regarding the first frequency as the fourth frequency information regarding the second frequency upon obtaining the second frequency information regarding the first frequency from the computed information calculated in the first search process and using the second frequency information in computation, and
- in the first search process, the search section uses the third frequency information regarding the second frequency as the first frequency information regarding the first frequency obtained by multiplying the second frequency by n upon obtaining the third frequency information regarding the second frequency from the computed information calculated in the second search process and using the third frequency information in computation.

19. The image processing apparatus according to claim 2, wherein in the second search process, the search section corrects a deviation of a phase of the second phase information in accordance with a spatial deviation amount between the first search standard point and the first corresponding point and uses the corrected second phase information in computation upon obtaining the second phase information from the computed information calculated in the first search process and using the second phase information in computation.

20. The image processing apparatus according to claim 2, wherein in the second search process, the search section performs weighting of information such that the computed information used in computation as part of information for computations regarding the third frequency information and the fourth frequency information less affects the search results on the second corresponding point than the other of the information for computations.

21. An image processing method, comprising the steps of:
(a) by an acquisition section, obtaining a first image;
(b) by the acquisition section, obtaining a second image;
(c) by a generation section, in accordance with a predetermined conversion factor, reducing a level of resolution of the first image to generate a first converted standard image and reducing a level of resolution of the second image to generate a first converted reference image;

(d) by a search section, performing a first search process of searching the first converted reference image for a first corresponding point that corresponds to a first standard point based on first phase information on each frequency component of first frequency information regarding a first standard area including the first standard point as a standard in the first converted standard image and based on second phase information on each frequency component of second frequency information regarding a first reference area including a first search standard point as a standard in the first converted reference image, and by a storage section, storing computed information regarding at least part of the first frequency information and the second frequency information obtained through the computation in the first search process;

(e) by a determination section, determining a position of a second search standard point in the second image based on a position of the first corresponding point in the first converted reference image; and (f) by the search section, performing a second search process of searching the second image for a second corresponding point that corresponds to a second standard point corresponding to the first standard point based on third phase information on each frequency component of third frequency information regarding a second standard area including the second standard point as a standard in the first image and based on fourth phase information on each frequency component of fourth frequency information regarding a second reference area including the second search standard point as a standard in the second image, wherein in the second search process, the search section uses the computed information as part of information for computations regarding the third frequency information and the fourth frequency information to calculate the other of the information for computations based on the first and second images.

22. An image processing method, comprising the steps of:
(A) by an acquisition section, obtaining a first image;
(B) by the acquisition section, obtaining a second image;
(C) by a generation section, in accordance with a predetermined conversion factor, reducing a level of resolution of the first image to generate a first converted standard image and a second converted standard image having a lower level of resolution than that of the first converted standard image, and reducing a level of resolution of the second image to generate a first converted reference image and a second converted reference image having a lower level of resolution than that of the first converted reference image;

(D) by a search section, performing a first search process of searching the second converted reference image for a first corresponding point that corresponds to a first standard point based on first phase information on each frequency component of first frequency information regarding a first standard area including the first standard point as a standard in the second converted standard image and based on second phase information on each frequency component of second frequency information regarding a first reference area including a first search standard point as a standard in the second converted reference image, and by a storage section, storing computed information regarding at least part of the first frequency information and the second frequency information obtained through the computation in the first search process;

(E) by a determination section, determining a position of a second search standard point in the first converted reference image based on a position of the first corresponding point in the second converted reference image; and (F) by the search section, performing a second search process of searching the first converted reference image for a second corresponding point that corresponds to a second standard point corresponding to the first standard point based on third phase information on each frequency component of third frequency information regarding a second standard area including the second standard point as a standard in the first converted standard image and based on fourth phase information on each frequency component of fourth frequency information regarding a second reference area including the second search standard point as a standard in the first converted reference image, wherein in the second search process, the search section uses the computed information as part of information for computations regarding the third frequency information and the fourth frequency information to calculate the other of the information for computations based on the first converted standard image and the first converted reference image.

23. A non-transitory computer readable recording medium storing a computer-readable program, the program controlling an image processing apparatus to operate as one image processing apparatus, and the one image processing apparatus comprising:

an acquisition section that obtains a first image and a second image;

a generation section that, in accordance with a predetermined conversion factor, reduces a level of resolution of the first image to generate a first converted standard image and reduces a level of resolution of the second image to generate a first converted reference image;

a search section that performs:
a first search process of searching the first converted reference image for a first corresponding point that corresponds to a first standard point based on first phase information on each frequency component of first frequency information regarding a first standard area including the first standard point as a standard in the first converted standard image and based on second phase information on each frequency component of second frequency information regarding a first reference area including a first search standard point as a standard in the first converted reference image; and a second search process of searching the second image for a second corresponding point that corresponds to a second standard point based on third phase information on each frequency component of third frequency information regarding a second standard area including the second standard point corresponding to the first standard point as a standard in the first image and based on fourth phase information on each frequency component of fourth frequency information regarding a second reference area including a second search standard point as a standard in the second image;

a determination section that determines a position of the second search standard point in the second image based on a position of the first corresponding point in the first converted reference image; and a storage section that stores computed information regarding at least part of the first frequency information and the second frequency information obtained through the computation in the first search process and the third frequency information obtained through the computation in the second search process, wherein the search section performs at least one of:

in the second search process, the process of using the computed information obtained through the computation in the first search process as part of information for computations regarding the third frequency information and the fourth frequency information to calculate the other of the information for computations regarding the third frequency information and the fourth frequency information based on the first and second images; and in the first search process, the process of using the computed information obtained through the computation in the second search process as part of information for computation regarding the first frequency information to calculate the other of the information for computation regarding the first frequency information based on the first converted standard image.

24. A non-transitory computer readable recording medium storing a computer-readable program, the program controlling an image processing apparatus to operate as one image processing apparatus, and the one image processing apparatus comprising:

an acquisition section that obtains a first image and a second image;

a generation section that, in accordance with a predetermined conversion factor, reduces a level of resolution of the first image to generate a first converted standard image and a second converted standard image having a lower level of resolution than that of the first converted standard image and reduces a level of resolution of the second image to generate a first converted reference image and a second converted reference image having a lower level of resolution than that of the first converted reference image;

a search section that performs:

a first search process of searching the second converted reference image for a first corresponding point that corresponds to a first standard point based on first phase information on each frequency component of first frequency information regarding a first standard area including the first standard point as a standard in the second converted standard image and based on second phase information on each frequency component of second frequency information regarding a first reference area including a first search standard point as a standard in the second converted reference image; and a second search process of searching the first converted reference image for a second corresponding point that corresponds to a second standard point corresponding to the first standard point based on third phase information on each frequency component of third frequency information regarding a second standard area including the second standard point as a standard in the first converted standard image and based on fourth phase information on each frequency component of fourth frequency information regarding a second reference area including a second search standard point as a standard in the first converted reference image;

a determination section that determines a position of the second search standard point in the first converted reference image based on a position of the first corresponding point in the second converted reference image; and a storage section that stores computed information regarding at least part of the first frequency information and the second frequency information obtained through the computation in the first search process and the third frequency information obtained through the computation in the second search process, wherein the search section performs at least one of:

in the second search process, the process of using the computed information obtained through the computation in the first search process as part of information for computations regarding the third frequency information and the fourth frequency information to calculate the other of the information for computations regarding the third frequency information and the fourth frequency information based on the first converted standard image and the first converted reference image; and in the first search process, the process of using the computed information obtained through the computation in the second search process as part of information for computation regarding the first frequency information to calculate the other of the information for computation regarding the first frequency information based on the second converted standard image.

* * * * *